United States Patent
Shibata et al.

(10) Patent No.: US 8,656,700 B2
(45) Date of Patent: Feb. 25, 2014

(54) FILTER FAILURE DETECTION APPARATUS OF AN INTERNAL COMBUSTION ENGINE

(75) Inventors: Daisuke Shibata, Numazu (JP); Hiroshi Sawada, Gotenba (JP); Toru Kidokoro, Hadano (JP); Taiga Hagimoto, Nagaizumi-cho (JP); Kazuya Takaoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/125,746

(22) PCT Filed: Oct. 22, 2010

(86) PCT No.: PCT/JP2010/068702
§ 371 (c)(1),
(2), (4) Date: Apr. 22, 2011

(87) PCT Pub. No.: WO2012/053097
PCT Pub. Date: Apr. 26, 2012

(65) Prior Publication Data
US 2013/0192208 A1  Aug. 1, 2013

(51) Int. Cl.
*F01N 3/00* (2006.01)
*F01N 3/02* (2006.01)

(52) U.S. Cl.
USPC .................................. 60/276; 60/277; 60/311

(58) Field of Classification Search
USPC ..................... 60/276, 277, 297, 311
See application file for complete search history.

(56) References Cited

U.S. PATENT DOCUMENTS

| | | |
|---|---|---|
| 2004/0216614 A1 | 11/2004 | Schulte et al. |
| 2007/0125075 A1* | 6/2007 | Zanini-Fisher et al. ........ 60/297 |
| 2008/0087007 A1 | 4/2008 | Konstandopoulos |
| 2010/0018186 A1 | 1/2010 | Shibata et al. |

FOREIGN PATENT DOCUMENTS

| | | |
|---|---|---|
| JP | A-2005-524015 | 8/2005 |
| JP | A-2005-325812 | 11/2005 |
| JP | A-2007-315275 | 12/2007 |
| JP | A-2007-327392 | 12/2007 |
| JP | A-2008-101606 | 5/2008 |
| JP | A-2009-144577 | 7/2009 |

OTHER PUBLICATIONS

International Search Report issued in International Application No. PCT/JP2010/068702 on Dec. 21, 2010 (with translation).

* cited by examiner

*Primary Examiner* — Kenneth Bomberg
*Assistant Examiner* — Audrey K Bradley
(74) *Attorney, Agent, or Firm* — Oliff PLC

(57) ABSTRACT

A failure of a filter is detected with a higher degree of accuracy. There are provided a filter that is arranged on an exhaust passage of an internal combustion engine for collecting a substance contained in an exhaust gas, a substance amount detection part that is arranged on the exhaust passage at a downstream side of the filter for detecting an amount of substance in the exhaust gas, a flow speed detection part that detects or estimates a flow speed of the exhaust gas which passes through the filter, and a determination part that makes a determination that the filter is in a failure, when the higher the flow speed of the exhaust gas passing through the filter, the larger a ratio of an amount of change in the amount of substance to an amount of change in the flow speed of the exhaust gas becomes.

17 Claims, 14 Drawing Sheets

FILTER FAILURE DETECTION APPARATUS OF AN INTERNAL COMBUSTION ENGINE

TECHNICAL FIELD

The present invention relates to a filter failure detection apparatus of an internal combustion engine.

BACKGROUND ART

There has been known a technique of detecting a failure of a filter which is arranged in an exhaust passage of an internal combustion engine for collecting particulate matter (PM) in an exhaust gas, based on a differential pressure between an upstream side and a downstream side of the filter (see, for example, a first patent document). However, it may also be difficult to detect a change in the differential pressure at the time when a failure has occurred in the filter, so there is a fear that the accuracy of failure detection may become low.

PRIOR ART REFERENCES

Patent Documents

[First Patent Document] Japanese patent application laid-open No. 2007-327392
[Second Patent Document] Japanese patent application laid-open No. 2008-101606

SUMMARY OF THE INVENTION

Problems to be Solved by the Invention

The present invention has been made in view of the above-mentioned problem, and has for its object to detect a failure of a filter with a higher degree of accuracy.

Means for Solving the Problems

In order to achieve the above-mentioned object, a filter failure detection apparatus of an internal combustion engine according to the present invention is provided with
a filter that is arranged on an exhaust passage of the internal combustion engine for collecting substances contained in an exhaust gas,
a substance amount detection part that is arranged on the exhaust passage at a downstream side of said filter for detecting an amount of said substances which pass through said filter,
a flow speed detection part that detects or estimates a flow speed of the exhaust gas which passes through said filter, and
a determination part that makes a determination that said filter is in a failure, in cases when the higher the flow speed of the exhaust gas passing through said filter, the larger a ratio of an amount of change in the amount of substances detected by said substance amount detection part to an amount of change in the flow speed of the exhaust gas detected or estimated by said flow speed detection part becomes.

Here, the higher the flow speed of the exhaust gas, the larger the rate of increase in the pressure loss in the filter becomes. Then, if the filter has broken, the amount of substance passing through a broken part thereof increases in a nonlinear manner in accordance with the increasing pressure loss. That is, in cases where the filter fails, for example, when the flow speed of the exhaust gas passing through the filter becomes higher, the rate of increase of the amount of substance detected by the substance amount detection part becomes higher. In contrast to this, in cases where the filter is normal, the relation between the flow speed of the exhaust gas passing through the filter and the amount of substance at the downstream side of the filter becomes linear. That is, in cases where the filter is normal, for example, when the flow speed of the exhaust gas passing through the filter becomes higher, the rate of increase of the amount of substance detected by the substance amount detection part becomes constant. In this manner, the ratio between the amount of change in the amount of substance to the amount of change in the flow speed of the exhaust gas has a large difference between the case where the filter is normal and the case where the filter has broken. Then, in cases where the higher the flow speed of the exhaust gas passing through the filter, the larger the ratio of the amount of change in the amount of substance to the amount of change in the flow speed of the exhaust gas becomes, a determination can be made that the filter is in a failure. In this manner, the failure of the filter is determined based on the flow speed of the exhaust gas passing through the filter and the amount of substance at the downstream side of the filter, so it is not necessary to estimate the amount of substance at the upstream side of the filter. In addition, the failure can be determined based on the measured values of sensors which have been generally used in the past. Moreover, it is possible to detect or estimate the flow speed of the exhaust gas passing through the filter with a higher degree of accuracy than the amount of substance at the upstream side of the filter, and hence, the accuracy of the failure determination of the filter can be improved. Here, note that by means of various techniques explained below, it is possible to detect that the higher the flow speed of the exhaust gas passing through the filter, the larger the ratio of the amount of change in the amount of substance to the amount of change in the flow speed of the exhaust gas becomes.

That is, in the present invention, said determination part can make a determination that said filter is in a failure, when the flow speed of the exhaust gas detected or estimated by said flow speed detection part is equal to or less than a threshold value in cases where the ratio of the amount of change in said amount of substance to the amount of change in said flow speed of the exhaust gas is equal to or larger than a specified value.

In cases where the filter fails, the amount of substance detected by the substance amount detection part increases in accordance with the higher flow speed of the exhaust gas. Then, when the flow speed of the exhaust gas reaches a certain value, the amount of substance begins to increase rapidly. A point (hereinafter also referred to a sudden change point) at which the amount of substance begins to increase rapidly corresponds to a time when the ratio of the amount of change in the amount of substance to the amount of change in the flow speed of the exhaust gas is the specified value. This sudden change point does not exist in cases where there is no failure in the filter. For this reason, the specified value becomes a value higher or larger than the ratio of the amount of change in the amount of substance to the amount of change in the flow speed of the exhaust gas in cases where the filter is normal. In addition, as the extent of the failure of the filter becomes higher, the sudden change point moves to the lower side of the flow rate of the exhaust gas. Accordingly, it is possible to determine the extent of the failure of the filter based on a flow speed of the exhaust gas at which the sudden change point appears. Then, that flow speed of the exhaust gas at which the sudden change point appears at the time when the extent of the failure has exceeded an allowable range is set as a threshold value. That is, in cases where the flow speed of the exhaust gas at the time when the sudden change point appears is equal to or less than the threshold value, a determination can be made that the extent of the failure of the filter has exceeded the allowable range.

In the present invention, said determination part can make a determination that said filter is in a failure, when the amount of substance detected by said substance amount detection part is equal to or larger than a threshold value in cases where the ratio of the amount of change in said amount of substance to the amount of change in said flow speed of the exhaust gas is equal to or larger than a specified value.

Here, at the time of the same flow speed of the exhaust gas, the sudden change point appears at a side in which the amount of substance is more than that at the time of the filter being normal. Accordingly, it is possible to determine the extent of the failure of the filter based on an amount of substance at which the sudden change point appears. Then, that amount of substance at which the sudden change point appears at the time when the extent of the failure has exceeded an allowable range is set as a threshold value. That is, in cases where the amount of substance at the time when the sudden change point appears is equal to or more than the threshold value, a determination can be made that the extent of the failure of the filter has exceeded the allowable range.

In the present invention, said determination part can make a determination that said filter is in a failure, when said amount of substance detected by said substance amount detection part is equal to or larger than a threshold value in cases where said flow speed of the exhaust gas is equal to or larger than a predetermined value.

This predetermined value is set as a lower limit value of the flow speed of the exhaust gas at the time when a sudden change point appears in cases where the filter is in a failure. In addition, the predetermined value may also be a flow speed of the exhaust gas at the time when a sudden change point appears immediately after the extent of the failure of the filter has exceeded an allowable limit. Moreover, the threshold value referred to herein is a lower limit value of the amount of substance detected by the substance amount detection part at the time of the filter being in a failure in cases where the flow speed of the exhaust gas passing through the filter is equal to or larger than the predetermined value. Further, the threshold value may also be a lower limit value of the amount of substance at the time when a sudden change point appears in cases where the filter is in a failure. That is, in cases where the filter is in a failure, the amount of substance detected by the substance amount detection part increases rapidly at the time when the flow speed of the exhaust gas exceeds a sudden change point, so when the amount of substance becomes equal to or larger than the threshold value, a determination can be made that the filter is in a failure.

Here, note that said determination part can change said threshold value in accordance with said flow speed of the exhaust gas. That is, the amount of substance detected by the substance amount detection part increases in accordance with the higher flow speed of the exhaust gas, and hence, if the threshold value is made higher according to this, it will become possible to carry out the failure detection with a higher degree of accuracy. Here, note that the threshold value can be set constant, thereby making the failure detection of the filter simple.

In the present invention, said determination part can determine whether said filter is in a failure, by making a comparison between said amount of substance detected by said substance amount detection part at the time of said flow speed of the exhaust gas being equal to or larger than a predetermined value, and said amount of substance detected by said substance amount detection part at the time of said flow speed of the exhaust gas being less than the predetermined value.

When the filter fails, the increase of the amount of substance becomes larger in accordance with the flow speed of the exhaust gas. In particular, when the flow speed of the exhaust gas becomes equal to or higher than a predetermined value, the amount of substance detected by the substance amount detection part increases rapidly, and hence, the amount of substance detected by the substance amount detection part has a large difference between the time in which the flow speed of the exhaust gas is less than the predetermined value, and the time in which the flow speed of the exhaust gas is equal to or larger than the predetermined value. Accordingly, by making a comparison between the individual amounts of substance, it is possible to determine whether the filter is in a failure.

Here, note that said determination part can make a determination that said filter is in a failure, in cases where a difference or ratio between said amount of substance detected by said substance amount detection part at the time of said flow speed of the exhaust gas being equal to or larger than a predetermined value and said amount of substance detected by said substance amount detection part at the time of said flow speed of the exhaust gas being less than the predetermined value is equal to or larger than a threshold value.

Here, in cases where the filter is in a failure, the amount of substance to be detected becomes larger when the flow speed of the exhaust gas is equal to or larger than the predetermined value than when the flow speed of the exhaust gas is less than the predetermined value. That is, the difference or ratio between the amounts of substance detected at the times of the individual flow speeds of the exhaust gas becomes larger. By comparing this difference or ratio with a threshold value, it is possible to determine whether the filter is in a failure. The threshold value referred to herein is a lower limit value of the above-mentioned difference or ratio in cases where the filter is in a failure.

In the present invention, said determination part can calculate the ratio of the amount of change in the amount of substance to the amount of change in the flow speed of the exhaust gas on the assumption that the flow speed of the exhaust gas and the amount of substance are in a linear relation, when said flow speed of the exhaust gas is within a predetermined range which includes a predetermined value, or within a predetermined range which is equal to or larger than the predetermined value, and can make a determination that said filter is in a failure, in cases where this ratio is equal to or larger than the threshold value.

Here, the predetermined range is a range which is needed in order to calculate the ratio of the amount of change in the amount of substance to the amount of change in the flow speed of the exhaust gas. By carrying out a plurality of detections of the amount of substance in this range, it is possible to calculate the ratio of the amount of change in the amount of substance to the amount of change in the flow speed of the exhaust gas. When the filter fails, in actuality, the flow speed of the exhaust gas and the amount of substance becomes a nonlinear relation, but by assuming that they are in a linear relation, the ratio (slope) of the amount of change in the amount of substance to the amount of change in the flow speed of the exhaust gas is calculated. In cases where the filter is in a failure, when the flow speed of the exhaust gas is higher than a sudden change point, the ratio of the amount of change in the amount of substance with respect to the amount of change in the flow speed of the exhaust gas becomes high. On the other hand, in cases where the filter is normal, this ratio is relatively low. Accordingly, if a lower limit value of the above-mentioned ratio at the time of the filter being in a failure is set as the threshold value, it is possible to determine whether the filter is in a failure. In this manner, by carrying out the plurality of detections of the amount of substance, and making a determination on the failure of the filter, it is possible to determine the failure with a higher degree of accuracy.

In the present invention, said determination part can calculate the ratio of the amount of change in the amount of substance to the amount of change in the flow speed of the exhaust gas on the assumption that the flow speed of the exhaust gas and the amount of substance are in a linear relation, when said flow speed of the exhaust gas is within a predetermined range which includes a predetermined value, and can make a determination that said filter is in a failure, in cases where a sum of a difference between an amount of substance obtained based on said ratio and the amount of substance detected by said substance amount detection part is equal to or larger than a threshold value.

In order to calculate the ratio of the amount of change in the amount of substance to the amount of change in the flow speed of the exhaust gas, a plurality of detections of the substance are carried out when the flow speeds of the exhaust gas varies. Here, in cases where the filter has failed, the flow speed of the exhaust gas and the amount of substance becomes in actuality a nonlinear relation. For this reason, in the case of assuming that there are in a linear relation, a difference occurs between the amount of substance obtained from the relation thus assumed and the amount of substance detected by the substance amount detection part. This difference becomes larger in accordance with the higher extent of the failure. In addition, this difference is obtained for each of the flow speeds of the exhaust gas at the time when the amount of substance is detected by the substance amount detection part. Then, the sum of such differences becomes a value which corresponds to the extent of the failure of the filter. Accordingly, if a lower limit value of the above-mentioned sum of the differences at the time of the filter being in a failure is set as the threshold value, it is possible to determine whether the filter is in a failure. Also, in cases where the filter is in a failure, the amount of substance increases rapidly at the time when the flow speed of the exhaust gas is in a predetermined range including a predetermined value, and so the above-mentioned sum of the differences becomes large. As a result of this, the failure detection of the filter can be carried out with a high degree of accuracy. In this manner, by carrying out the plurality of detections of the amount of substance, and making a determination on the failure of the filter, it is possible to determine the failure with a higher degree of accuracy.

In the present invention, said determination part can calculate the ratios of the amounts of change in the amount of substance to the amounts of change in the flow speed of the exhaust gas on the assumption that said flow speed of the exhaust gas and said amount of substance are in a linear relation, when said flow speed of the exhaust gas is equal to or larger than a predetermined value, and when said flow speed of the exhaust gas is less than the predetermined value, respectively, and can make a determination that said filter is in a failure, when a difference between these ratios or each of the ratios is equal to or larger than a threshold value.

Here, until the time when the flow speed of the exhaust gas exceeds a sudden change point, the ratio of the amount of change in the amount of substance with respect to the amount of change in the flow speed of the exhaust gas is relatively low. On the other hand, when the flow speed of the exhaust gas exceeds the sudden change point, the ratio of the amount of change in the amount of substance with respect to the amount of change in the flow speed of the exhaust gas becomes relatively high. That is, there occurs a difference in the ratio (slope) of the amount of change in the amount of substance to the amount of change in the flow speed of the exhaust gas between the time when the flow speed of the exhaust gas is equal to or larger than a predetermined value, and the time when the flow speed of the exhaust gas is less than the predetermined value. On the other hand, in cases where the filter is normal, there is substantially no difference in the ratio therebetween. Accordingly, if a lower limit value of the difference or ratio between the slopes at the time of the filter being in a failure is set as the threshold value, it is possible to determine whether the filter is in a failure. In this manner, by comparing the ratios of the amounts of change in the amount of substance to the amounts of change in the flow speed of the exhaust gas detected under different conditions with each other thereby to make a determination on the failure of the filter, it is possible to determine the failure with a higher degree of accuracy.

Here, note that said predetermined value may be a flow speed of the exhaust gas at the time when the ratio of the amount of change in the amount of substance detected by said substance amount detection part to the amount of change in the flow speed of the exhaust gas detected or estimated by said flow speed detection part at the time of the extent of the failure of the filter being on the border of an allowable range becomes a specified value. Thus, by determining the failure of the filter based on the flow speed of the exhaust gas at the time when the extent of the failure of the filter is on the border of the allowable range, the failure can be determined in an easy manner and with high accuracy.

In addition, said filter can be arranged on an exhaust passage of a diesel engine, and can collect particulate matter in an exhaust gas thereof. That is, in the diesel engine having a relatively large amount of emissions of particulate matter, the failure of the filter can be determined with a high degree of accuracy, so that it is possible to suppress the particulate matter from being emitted into the atmospheric air. Here, note that the engine may be a gasoline engine.

Moreover, said substance amount detection part may be a sensor that measures an amount of particulate matter in the exhaust gas. By the use of such a sensor, the particulate matter in the exhaust gas can be measured in an easy manner, so the failure determination of the filter becomes easy. Also, by measuring the amount of particulate matter by means of the sensor, it is possible to obtain the amount of the particulate matter in an accurate manner, and hence, the failure can be determined with a higher degree of accuracy.

Effect of the Invention

According to the present invention, the failure of the filter can be detected with a higher degree of accuracy.

BEST MODES FOR CARRYING OUT THE INVENTION

Hereinafter, reference will be made to specific forms of a filter failure detection apparatus of an internal combustion engine according to the present invention based on the attached drawings. Here, note that the following embodiments can be combined as appropriate.

First Embodiment

Figure 1:
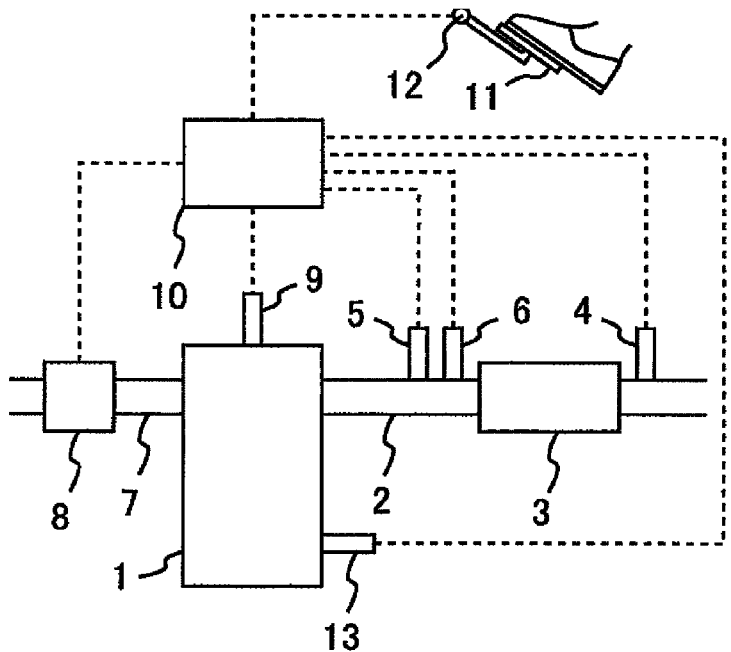
FIG. 1 is a view showing the schematic construction of a filter failure detection apparatus of an internal combustion engine according to an embodiment of the present invention.

FIG. 1 is a view showing the schematic construction of a filter failure detection apparatus of an internal combustion engine according to an embodiment of the present invention. In this embodiment, an internal combustion engine 1 is a diesel engine, but it may be a gasoline engine. An exhaust passage 2 is connected to the internal combustion engine 1. A filter 3 for collecting particulate matter (PM) in an exhaust gas is arranged on the exhaust passage 2.

A PM sensor 4 for detecting an amount of PM in the exhaust gas flowing out of the filter 3 is arranged on the exhaust passage 2 at a downstream side of the filter 3. The PM sensor 4 has a pair of electrodes, and outputs a signal corresponding to the amount of PM by making use of the fact that the resistance between the electrodes is changed according to an amount of PM which has adhered (deposited) between the electrodes. Based on this signal, it is possible to detect the amount of PM which has passed through the filter 3 per unit time. Here, note that the amount of PM passing through the filter 3 in a predetermined period of time may be detected. In addition, in this embodiment, the PM sensor 4 corresponds to a substance detection part in the present invention. Also, in this embodiment, PM corresponds to a substance in the present invention. A temperature sensor 5, which serves to measure the temperature of the exhaust gas flowing into the filter 3, and a pressure sensor 6, which serves to measure the pressure of the exhaust gas, are arranged on the exhaust passage 2 at an upstream side of the filter 3.

In addition, an intake passage 7 is connected to the internal combustion engine 1. An air flow meter 8 for measuring an amount of intake air in the internal combustion engine 1 is arranged on the intake passage 7. On the internal combustion engine 1, there is mounted a fuel injection valve 9 for injecting fuel into a corresponding cylinder.

In the internal combustion engine 1 constructed as stated above, there is arranged in combination therewith an ECU 10 which is an electronic control unit for controlling the internal combustion engine 1. Besides the above-mentioned sensors, an accelerator opening sensor 12, which serves to detect an engine load by outputting an electrical signal corresponding to an amount by which a driver depressed an accelerator pedal 11, and a crank position sensor 13, which serves to detect the number of revolutions per minute of the engine, are connected to the ECU 10 through electrical wiring, so that the output signals of these variety of kinds of sensors are inputted to the ECU 10.

In addition, the ECU 10 controls the operating state of the internal combustion engine 1 based on these inputted detection values by the respective sensors. For example, the ECU 10 calculates an amount of fuel to be injected from the fuel injection valve 9, and controls the fuel injection valve 9. Also, the ECU 10 calculates an amount of PM flowing out of the filter 3 per unit time, based on the output signal of the PM sensor 4. The relation between the output signal of the PM sensor 4 and the amount of PM flowing out of the filter 3 may be mapped beforehand. Then, in this embodiment, the failure detection of the filter 3 is carried out based on the output signal of the PM sensor 4.

Here, if the filter 3 breaks, for example, PM may pass through a broken part thereof, so PM flows out into the downstream side of the filter 3. For this reason, the amount of PM per unit time detected at the downstream side of the filter 3 increases.

Figure 2:
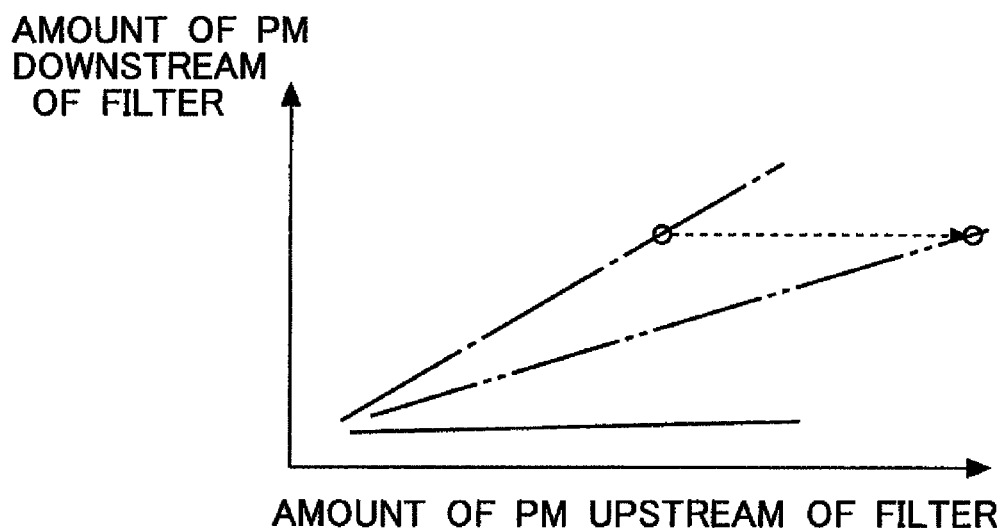
FIG. 2 is a view showing the relation between an amount of PM at a downstream side of a filter and an amount of PM at an upstream side of the filter.

FIG. 2 is a view showing the relation between the amount of PM at the upstream side of the filter 3 (also referred to as the amount of the filter upstream PM) and the amount of PM at the downstream side of the filter 3 (also referred to as the amount of the filter downstream PM). A solid line represents a case in which the filter 3 is normal; an alternate long and short dash line represents a case in which the filter 3 broke and failed; and an alternate long and two short dashes line represents a case in which the filter 3 broke and failed, while including an error. In cases where the filter 3 is normal, PM is collected in the filter 3 even if the amount of PM at the upstream of the filter 3 increases, so the amount of PM at the downstream side of the filter 3 does not almost increase. On the other hand, when the filter 3 breaks, PM passes through a broken part, so the amount of PM at the downstream side of the filter 3 increases in accordance with the increasing amount of PM at the upstream side of the filter 3.

If doing so, it is possible to detect the failure of the filter 3 by obtaining the relation between the amount of PM at the upstream side of the filter 3 and the amount of PM at the downstream side of the filter 3. However, it adds to the cost to provide a PM sensor at the upstream side of the filter 3 so as to obtain the amount of PM at the upstream side of the filter 3. In addition, it is also considered that the amount of PM at the upstream side of the filter 3 is estimated from the operating state of the internal combustion engine 1, etc., but such an estimation of the amount of PM includes a large error, thus resulting in a large shift from an actual value thereof, as shown by the alternate long and two short dashes line in FIG. 2. In this manner, if the failure detection of the filter 3 is carried out based on the estimated value shifted from the actual value, its accuracy will be low.

In contrast to this, in this embodiment, the failure detection of the filter 3 is carried out by paying attention to the relation between the flow speed of the exhaust gas passing through the filter 3 and the amount of PM at the downstream side of the filter 3. Here, note that the flow speed of the exhaust gas passing through the filter 3 may also be the flow speed of the exhaust gas flowing into the filter 3, or the flow speed of the exhaust gas flowing out of the filter 3. In addition, the amount of PM at the downstream side of the filter 3 may also be the amount of PM flowing out of the filter 3. Here, note that in the following, "the flow speed of the exhaust gas passing through the filter 3" is also referred to as "the filter passing flow speed", or simply as "the flow speed of the exhaust gas", and "the amount of PM at the downstream side of the filter 3" is also referred to as "the amount of PM".

The flow speed of the exhaust gas passing through the filter 3 is calculated as follows. First, the amount of gas GALL (g/s) passing through the filter 3 is calculated by the addition of the amount of intake air GA (g/s) measured by the air flow meter 8 and the amount of fuel injection GF (g/s) calculated by the ECU 10.

$$GALL = GA + GF$$

Then, the flow speed of the exhaust gas passing through the filter 3 Q is calculated according to the following equation.

$$Q = (GALL \times TGAS/PGAS) \times k$$

However, TGAS is the temperature of the exhaust gas flowing into the filter 3, PGAS is the pressure of the exhaust gas flowing into the filter 3, and k is a gas constant. The temperature TGAS of the exhaust gas flowing into the filter 3 is measured by means of the temperature sensor 5, and the pressure PGAS of the exhaust gas flowing into the filter 3 is measured by the pressure sensor 6. Here, note that these values may be estimated based on the operating state of the internal combustion engine 1, etc. In addition, in this embodiment, the ECU 10, which calculates the flow speed of the exhaust gas passing through the filter 3, corresponds to a flow speed detection part in the present invention. Here, note that a sensor for measuring the flow speed Q of the exhaust gas may be provided so that the flow speed Q of the exhaust gas can be obtained by the sensor.

Figure 3:
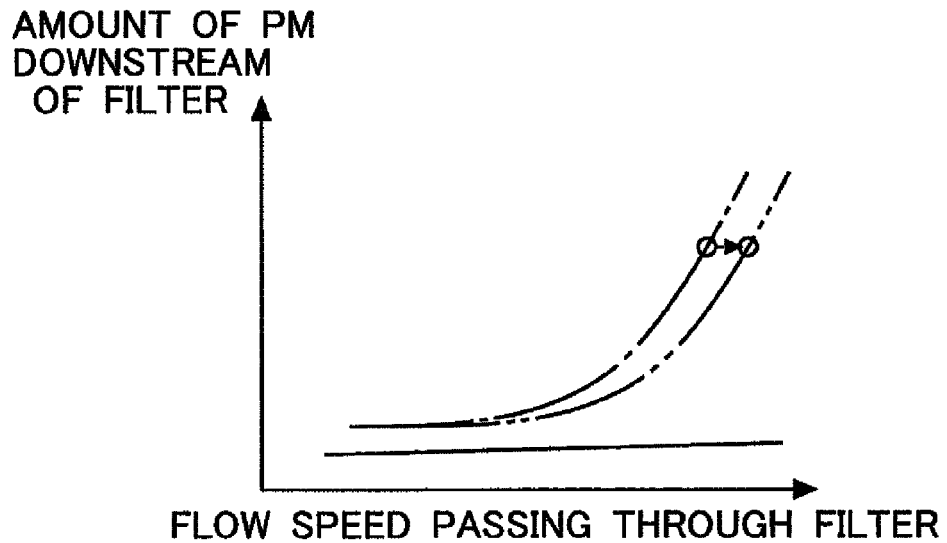
FIG. 3 is a view showing the relation between a flow speed of an exhaust gas passing through the filter and the amount of PM at the downstream side of the filter.

FIG. 3 is a view showing the relation between the flow speed of the exhaust gas passing through the filter 3 and the amount of PM at the downstream side of the filter 3. A solid line represents a case in which the filter 3 is normal; an alternate long and short dash line represents a case in which the filter 3 broke and failed; and an alternate long and two short dashes line represents a case in which the filter 3 broke and failed, while including an error. Here, physical quantities (for example, an amount of intake air and an amount of fuel injection) which are needed so as to calculate the flow speed of the exhaust gas passing through the filter 3 can be measured with high accuracy by existing sensors. For this reason, it is higher in precision to estimate the flow speed of the exhaust gas passing through the filter 3 rather than estimating the amount of PM at the upstream side of the filter 3. That is, the estimated value of the flow speed of the exhaust gas passing through the filter 3 is less in error as compared with the estimated value of the amount of PM at the upstream side of the filter 3.

Here, the higher the flow speed of the exhaust gas, the larger the rate of increase in the pressure loss in the filter 3 becomes. Then, if the filter 3 has broken, the amount of PM passing through a broken part thereof increases in a nonlinear manner in accordance with the increasing pressure loss. In contrast to this, in cases where the filter 3 is normal, the relation between the flow speed of the exhaust gas passing through the filter 3 and the amount of PM at the downstream side of the filter 3 becomes linear. Thus, the relation between the flow speed of the exhaust gas passing through the filter 3 and the amount of PM at the downstream side of the filter 3 has a large difference between the case where the filter 3 is normal and the case where the filter 3 has broken. For this reason, the failure detection of the filter 3 is carried out with a high degree of accuracy based on the relation between the flow speed of the exhaust gas passing through the filter 3 and the amount of PM at the downstream side of the filter 3.

For example, in cases where the relation between the flow speed of the exhaust gas passing through the filter 3 and the amount of PM at the downstream side of the filter 3 is nonlinear, a determination can be made that the filter 3 is in a failure. Here, note that in this embodiment, the ECU 10, which determines whether the catalyst 3 is in a failure, corresponds to a determination part in the present invention.

Figure 4:
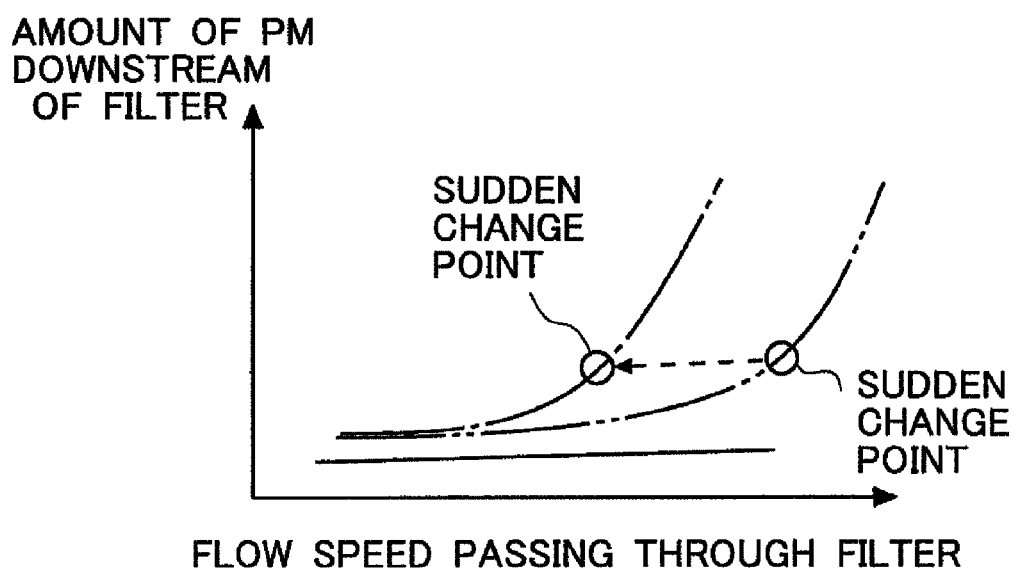
FIG. 4 is a view showing the relation among the flow speed of the exhaust gas passing through the filter, the amount of PM at the downstream side of the filter, and the extent of the failure of the filter.

In addition, it is also possible to determine the extent or degree of the failure of the filter 3 based on the relation between the flow speed of the exhaust gas passing through the filter 3 and the amount of PM at the downstream side of the filter 3. FIG. 4 is a view showing the relation among the flow speed of the exhaust gas passing through the filter 3, the amount of PM at the downstream side of the filter 3, and the extent of the failure of the filter 3. A solid line represents a case in which the filter 3 is normal; an alternate long and short dash line represents a case in which the extent of the failure of the filter 3 is high; and an alternate long and two short dashes line represents a case in which the extent of the failure of the filter 3 is low. Here, in cases where the filter 3 has failed, during the time when the flow speed of the exhaust gas becomes higher, there exists a point (hereinafter referred to as a sudden change point) at which the amount of PM begins to increase rapidly. This sudden change point may also be a point at which the ratio of the amount of change in the amount of PM with respect to the amount of change in the flow speed of the exhaust gas becomes a specified value.

Then, the higher the extent of the failure, from the lower flow speed the amount of PM which passes through the broken part of the filter 3 comes to increase. That is, the higher the extent of the failure, to the lower flow speed side of the exhaust gas the sudden change point moves. Here, in cases where the extent of the failure has exceeded an allowable limit, a flow speed of the exhaust gas at which the sudden change point appears is beforehand set as a threshold value. As a result of this, when the flow speed of the exhaust gas at the time the sudden change point appears is equal to or less than the threshold value, a determination can be made that the extent of the failure of the filter 3 has exceeded an allowable range.

In addition, it is also possible to detect the failure of the filter 3 based on the amount of PM at the downstream side of the filter 3 at the time when the sudden change point appeared. Here, as the extent of the failure of the filter 3 becomes high, the sudden change point moves to a side at which the amount of PM is large. For this reason, if the amount of PM at the downstream side of the filter 3 at the time when the sudden change point appeared is equal to or higher than the threshold value, a determination can be made that the filter 3 is in a failure. This threshold value has been beforehand obtained through experiments, etc., as the amount of PM at the downstream side of the filter 3 at the time when the sudden change point appears in cases where the extent of the failure becomes the allowable limit.

In this manner, by performing the failure detection of the filter 3 based on the amount of PM at the downstream side of the filter 3 with respect to the flow speed of the exhaust gas passing through the filter 3, it is not necessary to estimate the amount of PM at the upstream side of the filter 3. In addition, the failure detection can be carried out based on the measured values of the sensors which have been generally used in the past. Moreover, it is possible to estimate the flow speed of the exhaust gas passing through the filter 3 with a higher degree of accuracy than the amount of PM at the upstream side of the filter 3, and hence, the accuracy of the failure detection of the filter 3 can be improved.

Second Embodiment

In this embodiment, in cases where the amount of PM at the downstream side of the filter 3 at the time when the flow speed of the exhaust gas is equal to or larger than a predetermined value A is equal to or more than a threshold value B, the ECU 10 makes a determination that the filter 3 is in a failure. The other devices, parts and so on are the same as those in the first embodiment, so the explanation thereof is omitted.

Figure 5:
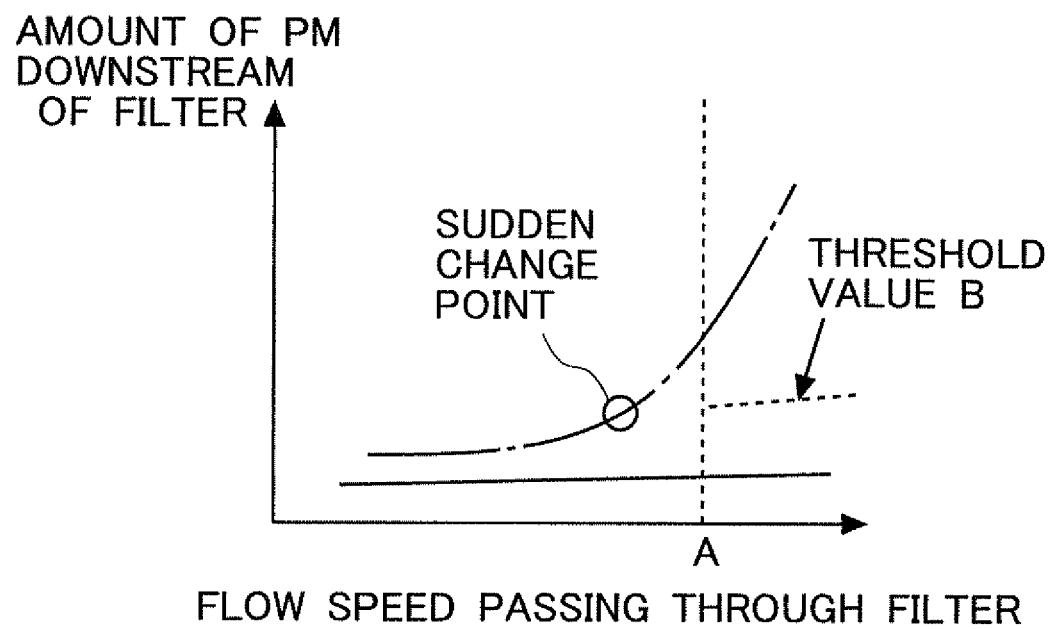
FIG. 5 is a view showing the relation among the flow speed of the exhaust gas passing through the filter, the amount of PM at the downstream side of the filter, a predetermined value A, and a threshold value B.

FIG. 5 is a view showing the relation among the flow speed of the exhaust gas passing through the filter 3, the amount of PM at the downstream side of the filter 3, the predetermined value A, and the threshold value B. A solid line represents a case in which the filter 3 is normal, and an alternate long and short dash line represents a case in which the filter 3 is in a failure. The predetermined value A is set as a value which is equal to or larger than a lower limit value of the flow speed of the exhaust gas at which a sudden change point appears in cases where the filter 3 is in a failure. The predetermined value A may also be a flow speed of the exhaust gas at which a sudden change point appears at the time when the extent of the failure of the filter 3 reached an allowable limit. The threshold value B has been beforehand obtained through experiments, etc., as an upper limit value of the amount of PM at the downstream side of the filter 3 when the filter 3 is normal, in cases where the flow speed of the exhaust gas passing through the filter 3 is the predetermined value A. In addition, the threshold value B may also be a lower limit value of the amount of PM at which a sudden change point appears when the filter 3 is in a failure. Also, the threshold value B may be constant without regard to the flow speed of the exhaust gas passing through the filter 3, or may be made larger in accordance with the increasing flow speed of the exhaust gas passing through the filter 3. In this manner, the predetermined value A and the threshold value B are set to be within a range in which the sudden change point can take in the broken filter 3.

In this manner, the amount of PM increases rapidly at the side in which the flow speed of the exhaust gas is higher than the sudden change point, so when the extent of the failure of the filter 3 becomes higher, the amount of PM flowing out of the filter 3 increases at the side in which the flow speed is high. If this phenomenon is made use of, it will be possible to carry out the failure detection of the filter 3 with a high degree of accuracy.

Figure 6:
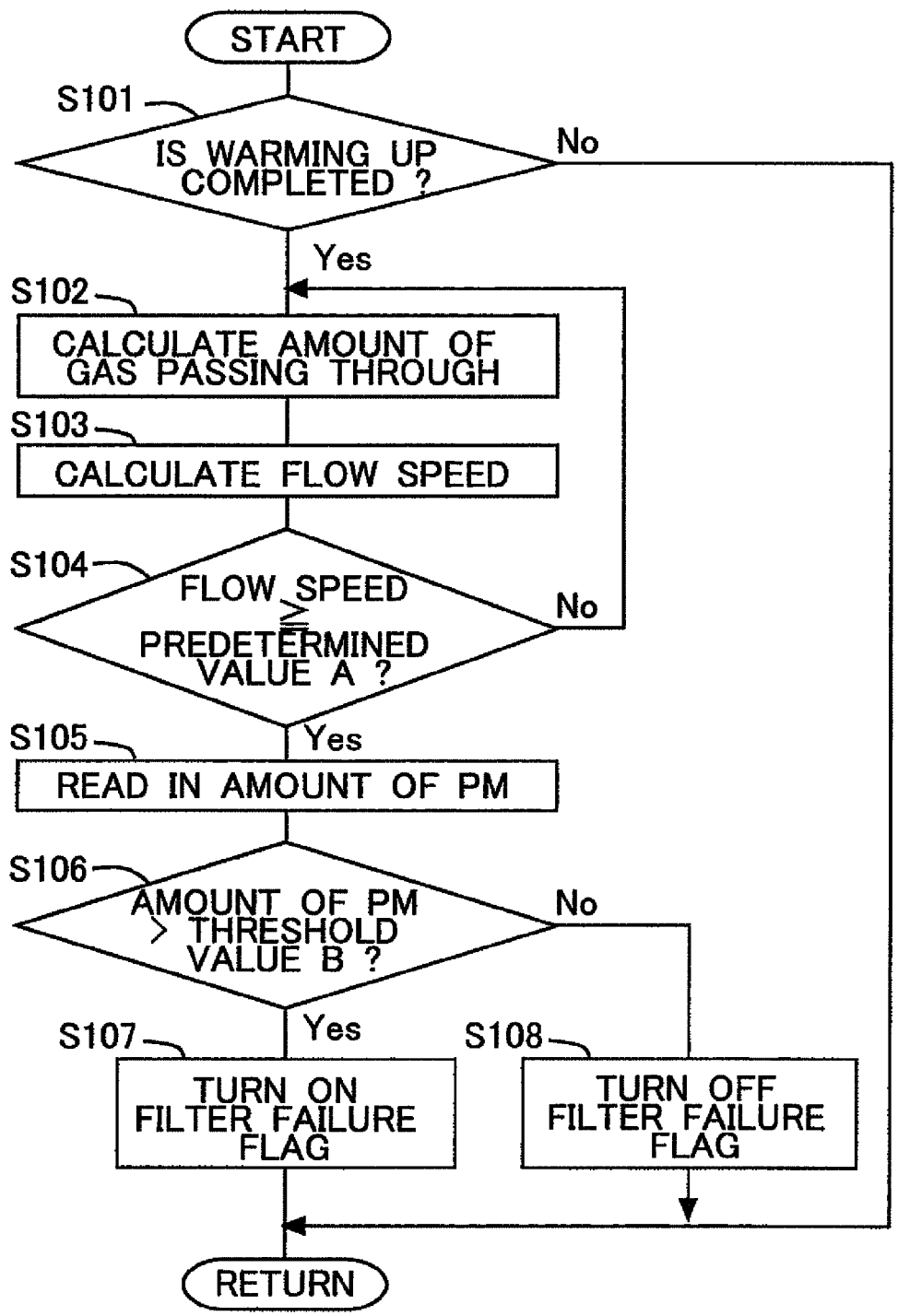
FIG. 6 is a flow chart showing a flow for detecting a failure of a filter according to a second embodiment.

FIG. 6 is a flow chart showing a flow for detecting the failure of the filter 3 according to the second embodiment. This routine is carried out by means of the ECU 10 at each predetermined time interval.

In step S101, it is determined whether the warming up of the internal combustion engine 1 has been completed. Here, the amount of PM discharged from the internal combustion engine 1 may become relatively large before the warming up of the internal combustion engine 1 is completed, so there is a possibility that it may become impossible to distinguish such a case from the failure of the filter 3. For this reason, the accuracy of the failure detection can be improved by carrying out the failure detection of the filter 3 after the warming up of the internal combustion engine 1 has been completed. For example, when the cooling water temperature of the internal combustion engine 1 is equal to or higher than the temperature thereof after the completion of the warming up, a determination is made that the warming up of the internal combustion engine 1 has been completed. In cases where an affirmative determination is made in step S101, the routine advances to step S102, whereas in cases where a negative determination is made, this routine is ended without carrying out the failure detection.

In step S102, the amount of gas passing through the filter 3 is calculated. This amount of gas is the mass of the exhaust gas passing through the filter 3 per unit time. This amount of gas is a value which is obtained by the addition of the amount of intake air measured by the air flow meter 8 and the amount of fuel injection calculated by the ECU 10.

In step S103, the flow speed of the exhaust gas passing through the filter 3 is calculated according to the following equation.

$$Q = (GALL \times TGAS/PGAS) \times k$$

where Q is the flow speed of the exhaust gas passing through the filter 3; GALL is the amount of gas calculated in step S102; TGAS is the temperature of the exhaust gas flowing into the filter 3; PGAS is the pressure of the exhaust gas flowing into the filter 3; and k is the gas constant. The temperature TGAS of the exhaust gas flowing into the filter 3 is measured by means of the temperature sensor 5, and the pressure PGAS of the exhaust gas flowing into the filter 3 is measured by the pressure sensor 6. Here, note that these values may be estimated based on the operating state of the internal combustion engine 1, etc. In this embodiment, the ECU 10, which carries out the processing of step S103, corresponds to a flow speed detection part in the present invention.

In step S104, the flow speed of the exhaust gas passing through the filter 3 is equal to or higher than a predetermined value A. This predetermined value A is the predetermined value A shown in FIG. 5. That is, in this step, it is determined whether the flow speed of the exhaust gas passing through the filter 3 is equal to or higher than a flow speed of the exhaust gas at which a sudden change point appears in cases where the filter 3 is in a failure. In cases where an affirmative determination is made in step S104, the routine advances to step S105, whereas in cases where a negative determination is made, the routine returns to step S102.

In step S105, the amount of PM at the downstream side of the filter 3 is read in. That is, the amount of PM detected by the PM sensor 4 is read in.

In step S106, it is determined whether the amount of PM read in step S105 is more than a threshold value B. This threshold value B is the threshold value B shown in FIG. 5. That is, in this step, it is determined whether the filter 3 is in a failure. In cases where an affirmative determination is made in step S106, the routine advances to step S107, whereas in cases where a negative determination is made, the routine advances to step S108. Here, note that in this embodiment, the ECU 10, which carries out the processing of step S106, corresponds to a determination part in the present invention.

In step S107, a filter failure flag is set to ON, and in step S108, the filter failure flag is set to OFF. This filter failure flag is a flag which indicates whether the filter 3 is in a failure, wherein it is set to ON when the filter 3 is in a failure, and it is set to OFF when the filter 3 is normal. When the filter failure flag is set to ON, a warning is made to a driver, for example, by turning on a lamp which indicates that the filter 3 is in a failure.

Thus, by performing the failure detection of the filter 3 based on the amount of PM at the downstream side of the filter 3 with respect to the flow speed of the exhaust gas passing through the filter 3, it is not necessary to estimate the amount of PM at the upstream side of the filter 3. In addition, the failure detection can be carried out based on the measured values of the sensors which have been generally used in the past. Moreover, it is possible to estimate the flow speed of the exhaust gas passing through the filter 3 with a higher degree of accuracy than the amount of PM at the upstream side of the filter 3, and hence, the accuracy of the failure detection of the filter 3 can be improved.

Third Embodiment

In this embodiment, it is determined whether the filter 3 is in a failure, by making a comparison between the amount of PM at the downstream side of the filter 3 at the time when the flow speed of the exhaust gas is less than a predetermined value A, and the amount of PM at the downstream side of the filter 3 at the time when the flow speed of the exhaust gas is equal to or higher than the predetermined value A. Here, note that the predetermined value A is the same as that in the second embodiment. The other devices, parts and so on are the same as those in the first embodiment, so the explanation thereof is omitted.

As explained in the second embodiment, when the filter 3 is in a failure, in cases where the flow speed of the exhaust gas is equal to or higher than the predetermined value A, the amount of change in the amount of PM at the downstream side of the filter 3 becomes larger with respect to the amount of change in the flow speed of the exhaust gas. On the other hand, even if the filter 3 is in a failure, when the extent of the failure thereof is low, the amount of PM at the downstream side of the filter 3 is relatively small in cases where the flow speed of the exhaust gas is less than the predetermined value A. In addition, when the extent of the failure of the filter 3 is high, even if the flow speed of the exhaust gas is less than the predetermined value A, the amount of PM at the downstream side of the filter 3 is relatively large.

That is, the amount of PM at the downstream side of the filter 3 in cases where the flow speed of the exhaust gas is equal to or larger than the predetermined value A, and the amount of PM at the downstream side of the filter 3 in cases where the flow speed of the exhaust gas is less than the predetermined value A are compared with each other, and when the difference or the ratio therebetween is large, a determination can be made that the filter 3 is in a failure.

Figure 7:
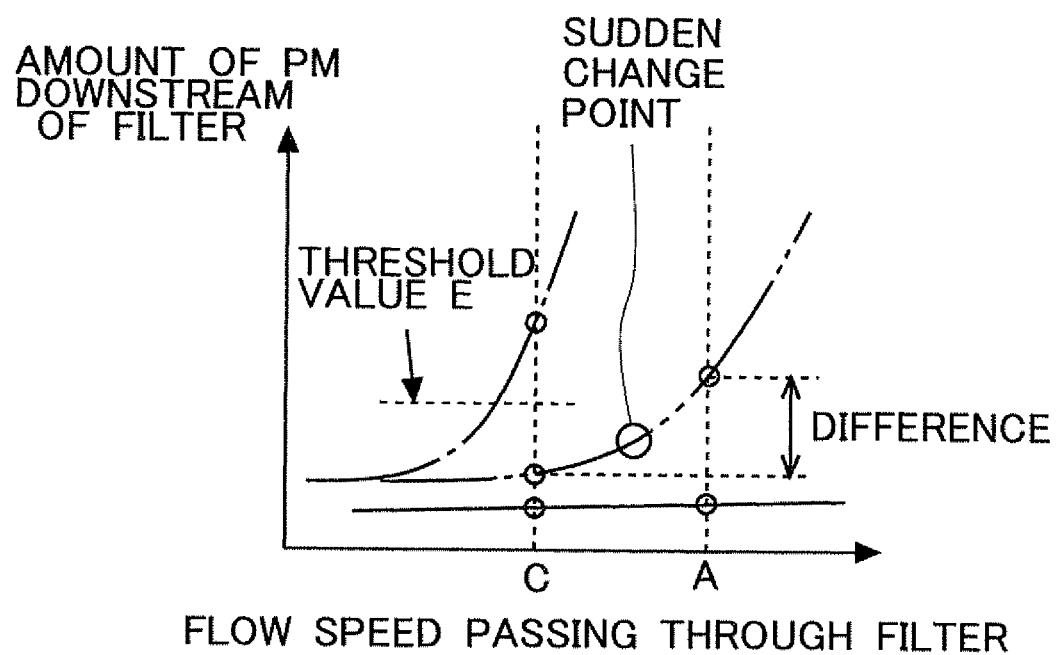
FIG. 7 is a view showing the relation among the flow speed of the exhaust gas passing through the filter, the amount of PM at the downstream side of the filter, the predetermined value A, and a predetermined value C.

FIG. 7 is a view showing the relation among the flow speed of the exhaust gas passing through the filter 3, the amount of PM at the downstream side of the filter 3, a predetermined value A, and a predetermined value C. A solid line represents a case in which the filter 3 is normal; an alternate long and short dash line represents a case in which the extent of the failure of the filter 3 is relatively high; and an alternate long and two short dashes line represents a case in which the extent of the failure of the filter 3 is relatively low. The predetermined value A is the same as that in the second embodiment. The predetermined value C is set as a value which is less than the predetermined value A and is less than a lower limit value of the flow speed of the exhaust gas at which a sudden change point appears in cases where the filter 3 is in a failure. The predetermined value C may also be a flow speed which is lower than the flow speed of the exhaust gas at which the above-mentioned sudden change point appears at the time when the extent of the failure of the filter 3 reached an allowable limit. In addition, the predetermined value C has been beforehand obtained through experiments, etc., as a value which is lower than the flow speed of the exhaust gas at which a sudden change point appears in cases where the extent of the failure of the filter 3 is relatively low, and which is higher than the flow speed of the exhaust gas at which a sudden change point appears in cases where the extent of the failure of the filter 3 is relatively high.

In cases where the filter 3 is in a failure, the flow speed of the exhaust gas at which the sudden change point appears becomes equal to or less than the predetermined value A. Then, in cases where the extent of the failure is relatively low, the flow speed of the exhaust gas at which the sudden change point appears becomes equal to or larger than the predetermined value C, and less than the predetermined value A. In this case, the amount of PM at the time when the flow speed of the exhaust gas is the predetermined value C is relatively small, and the amount of PM at the time when the flow speed of the exhaust gas is the predetermined value A becomes relatively large. For this reason, when the filter 3 is in a failure, the difference or the ratio between the amount of PM at the downstream side of the filter 3 at the time when the flow speed of the exhaust gas is the predetermined value A, and the amount of PM at the downstream side of the filter 3 at the time when the flow speed of the exhaust gas is the predetermined value C becomes large. On the other hand, in cases where the filter 3 is normal, this difference or ratio becomes zero or a relatively small value.

Accordingly, the failure of the filter 3 can be detected by calculating the value of the difference or the ratio between the amount of PM at the time of the flow speed of the exhaust gas being the predetermined value A and the amount of PM at the time of the flow speed of the exhaust gas being the predetermined value C, and comparing this value with a threshold value D. The threshold value D referred to herein is an upper limit value of the above-mentioned difference or ratio in cases where the filter 3 is normal. Here, note that in cases where the extent of the failure of the filter 3 is relatively high, the flow speed of the exhaust gas at which the sudden change point appears becomes less than the predetermined value C, so the amount of PM at the time of the flow speed of the exhaust gas being the predetermined value C becomes large. For this reason, when the amount of PM at the time of the flow speed of the exhaust gas being less than the predetermined value C exceeds a threshold value E, it can be determined that the filter 3 is in a failure. In this case, the failure of the filter 3 can be determined even if the amount of PM at the time of the flow speed of the exhaust gas being equal to or larger than the predetermined value A is not detected, and hence it is possible to shorten the time required for the failure determination. Here, note that the threshold value E is a lower limit value of the amount of PM at the time when the flow speed of the exhaust gas is the predetermined value C in cases where the extent of the failure of the filter 3 is relatively high.

Figure 8:
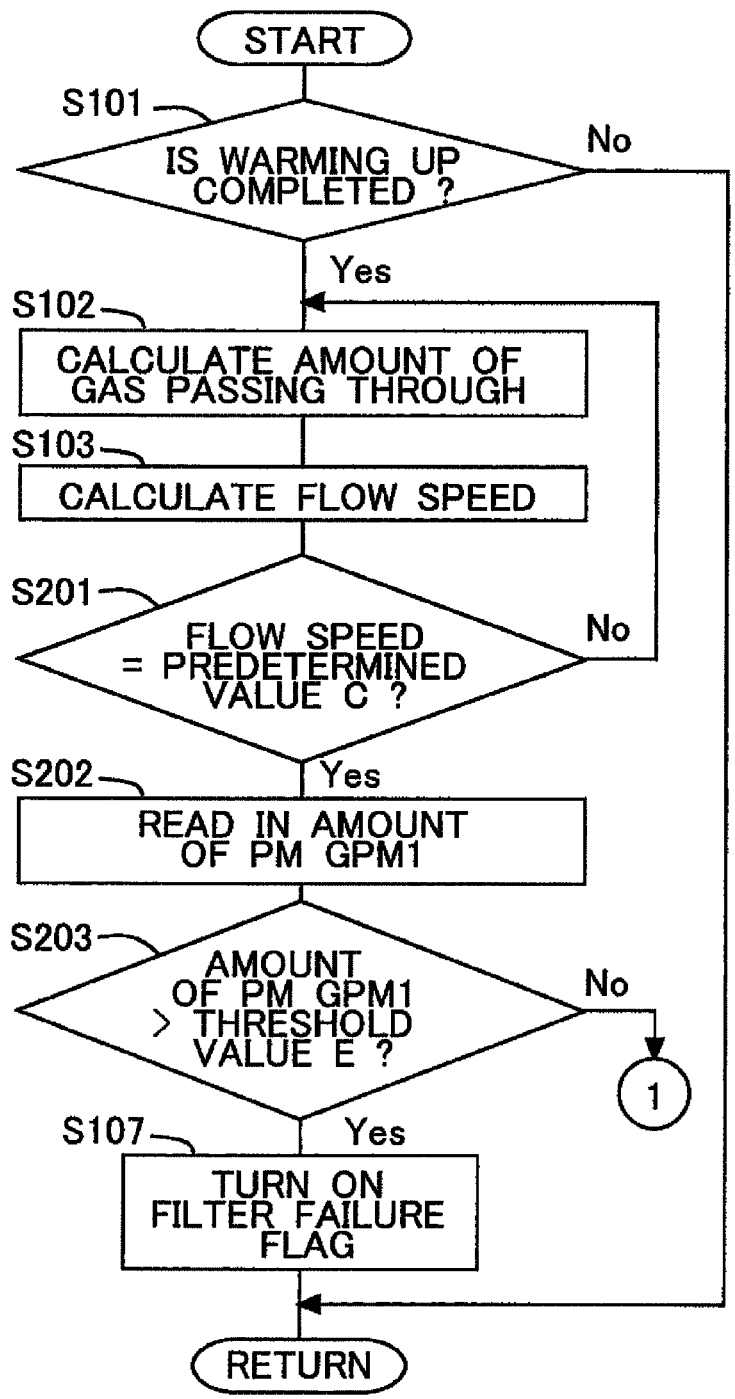
FIG. 8 is a flow chart showing a flow (a first part) for detecting a failure of a filter according to a third embodiment.
Figure 9:
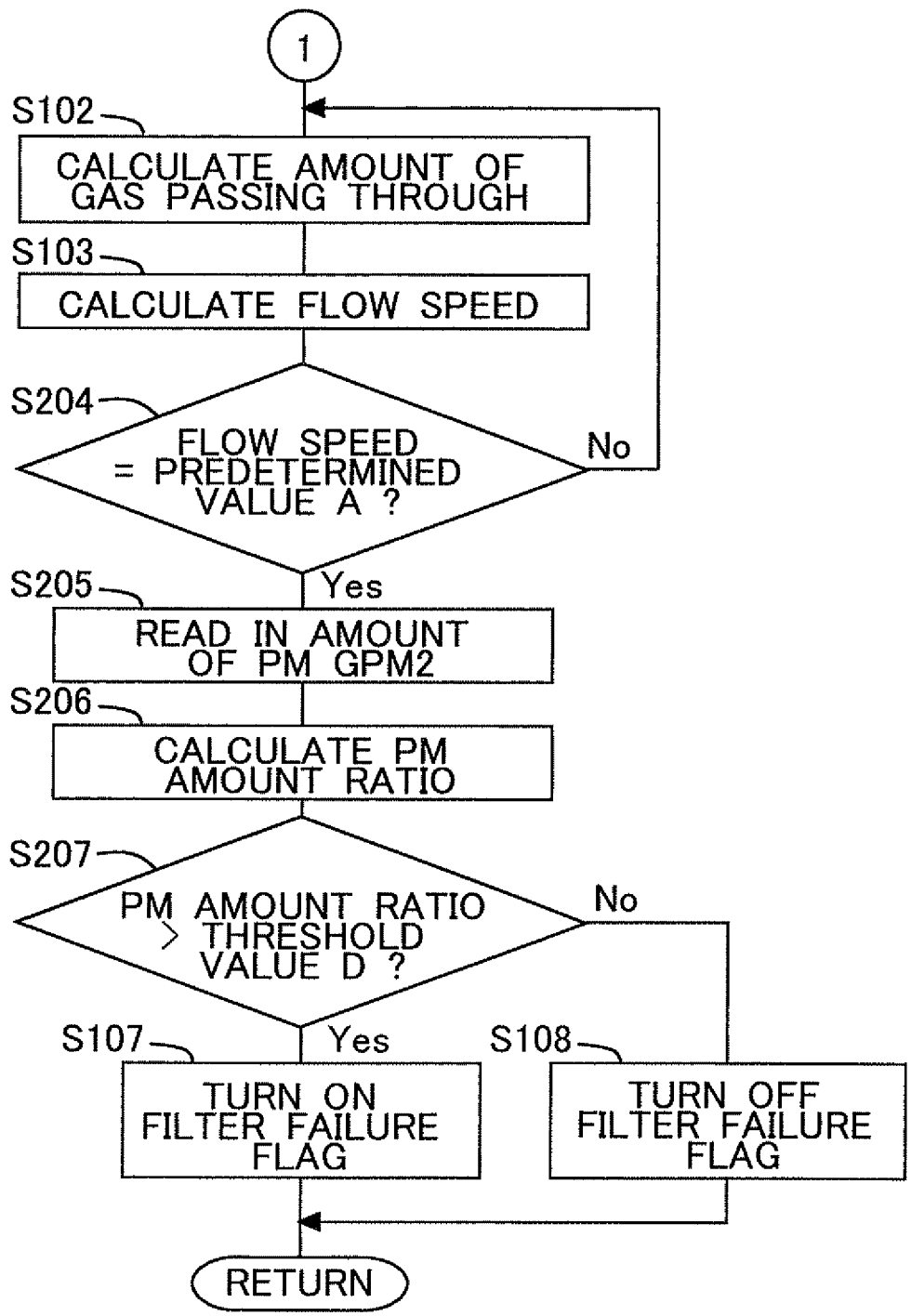
FIG. 9 is a flow chart showing a flow (a second continued part) for detecting a failure of a filter according to the third embodiment.

Next, FIG. 8 and FIG. 9 are flow charts showing a flow for detecting the failure of the filter 3 according to this embodiment. This routine is carried out by means of the ECU 10 at each predetermined time interval. Here, note that for those steps in which the same processing as in the aforementioned flow chart is carried out, the same symbols are attached and an explanation thereof is omitted.

In step S201, it is determined whether the flow speed of the exhaust gas is the predetermined value C. Here, note that when the flow speed of the exhaust gas is within a predetermined range including the predetermined value C, a determination can be made that the flow speed of the exhaust gas is the predetermined value C.

In step S202, an amount of PM GPM1 at the time of the flow speed of the exhaust gas being the predetermined value C is read in.

In step S203, it is determined whether the amount of PM GPM1 read in step S202 is more than the threshold value E. In this step, it is determined whether the extent of the failure of the filter 3 is relatively high. In cases where an affirmative determination is made in step S203, the routine advances to step S107, in which the filter failure flag is set to ON. On the other hand, in cases where a negative determination is made in step S203, the routine advances to step S204 by way of steps S102 and S103.

In step S204, it is determined whether the flow speed of the exhaust gas is the predetermined value A. Here, note that when the flow speed of the exhaust gas is within a predetermined range including the predetermined value A, a determination can be made that the flow speed of the exhaust gas is the predetermined value A.

In step S205, an amount of PM GPM2 at the time of the flow speed of the exhaust gas being the predetermined value A is read in.

In step S206, a ratio of the amounts of PM (GPM2/GPM1), which is a ratio of the amount of PM GPM2 at the time of the flow speed of the exhaust gas being the predetermined value A and the amount of PM GPM1 at the time of the flow speed of the exhaust gas being the predetermined value C, is calculated.

In step S207, it is determined whether the ratio of the amounts of PM (GPM2/GPM1) is larger than the threshold value D. In this step, it is determined whether the extent of the failure of the filter 3 is low. In cases where an affirmative determination is made in step S207, the routine advances to step S107, whereas in cases where a negative determination is made, the routine advances to step S108. Here, note that in this embodiment, the ECU 10, which carries out the processing of step S207, corresponds to a determination part in the present invention.

Here, note that it may be determined whether the difference between the amounts of PM (GPM2−GPM1), in place of the ratio of the amounts of PM (GPM2/GPM1), is larger than a threshold value.

In this manner, a determination as to whether the filter 3 is in a failure can be made with a high degree of accuracy by making a comparison between the amount of PM at the downstream side of the filter 3 at the time of the flow speed of the exhaust gas being less than the predetermined value A and the amount of PM at the downstream side of the filter 3 at the time of the flow speed of the exhaust gas being equal to or higher than the predetermined value A.

Fourth Embodiment

In this embodiment, when the flow speed of the exhaust gas is within a predetermined range which includes a predetermined value A, or within a predetermined range which is equal to or larger than the predetermined value A, the ratio of the amount of change in the amount of PM to the amount of change in the flow speed of the exhaust gas on the assumption that the flow speed of the exhaust gas and the amount of PM are in a linear relation is calculated, and in cases where this ratio is equal to or larger than a threshold value, a determination is made that the filter 3 is in a failure. Here, note that the predetermined value A is the same as that in the second embodiment. The other devices, parts and so on are the same as those in the first embodiment, so the explanation thereof is omitted.

As explained in the second embodiment, in cases where the filter 3 is in a failure, when the flow speed of the exhaust gas becomes equal to or higher than the predetermined value A, the amount of change in the amount of PM at the downstream side of the filter 3 becomes larger with respect to the amount of change in the flow speed of the exhaust gas. Accordingly, the ratio of the amount of change in the amount of PM to the amount of change in the flow speed of the exhaust gas becomes larger in accordance with the increasing flow speed of the exhaust gas.

Figure 10:
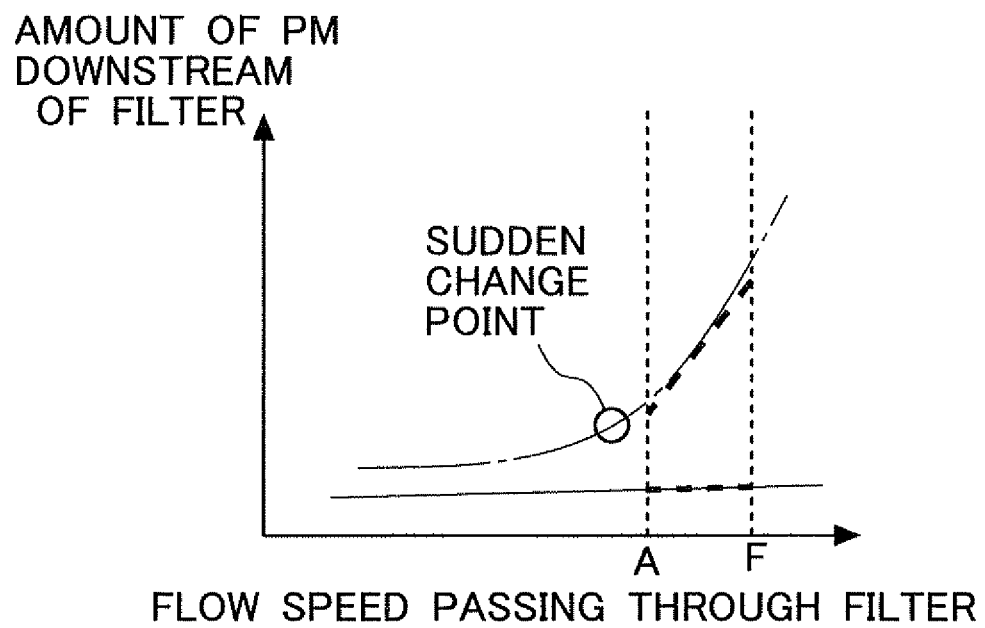
FIG. 10 is a view showing the relation among the flow speed of the exhaust gas passing through the filter, the amount of PM at the downstream side of the filter, the predetermined value A, and a predetermined value F.

Here, FIG. 10 is a view showing the relation among the flow speed of the exhaust gas passing through the filter 3, the amount of PM at the downstream side of the filter 3, a predetermined value A, and a predetermined value F. A solid line represents a case in which the filter 3 is normal, and an alternate long and short dash line represents a case in which the filter 3 is in a failure. Also, a broken line represents a case in which it is assumed that the flow speed of the exhaust gas and the amount of PM are in a linear relation. The predetermined value A is the same as that in the second embodiment. The predetermined value F is an upper limit value of the flow rate of the exhaust gas for acquiring the amount of PM, and an optimum value thereof has been beforehand obtained through experiments, etc. Here, note that in this embodiment, a range from the predetermined value A to the predetermined value F corresponds to a predetermined range in the present invention. In addition, in this embodiment, the failure detection of the filter 3 is carried out based on the amount of PM which is obtained when the flow speed of the exhaust gas is equal to or larger than the predetermined value A, and is equal to or less than the predetermined value F.

Here, in this embodiment, the ratio of the amount of change in the amount of PM to the amount of change in the flow speed of the exhaust gas is calculated based on the amount of PM which is obtained when the flow speed of the exhaust gas is equal to or larger than the predetermined value A and is equal to or less than the predetermined value F. This ratio is calculated by the use of the method of least squares, for example, while assuming that the flow speed of the exhaust gas and the amount of PM are in a linear relation. That is, the slope of a line which approximates the alternate long and short dash line shown in FIG. 10 is calculated. For this reason, the acquisition of the amount of PM is carried out a plurality of times by changing the flow speed of the exhaust gas. Here, note that the ratio of the amount of change in the amount of PM to the amount of change in the flow speed of the exhaust gas may also be the slope of a tangent line of a curve which is shown by the alternate long and short dash line in FIG. 10.

The slope obtained in this manner becomes larger in accordance with the extent of the failure of the filter 3. That is, in cases where the flow speed of the exhaust gas is equal to or larger than the predetermined value A, when the filter 3 is in a failure, the degree of increase in the amount of PM at the downstream side of the filter 3 becomes larger in accordance with the increasing flow speed of the exhaust gas. For this reason, the above-mentioned slope becomes larger in the case of the normal filter 3 as compared with the failed filter 3. Accordingly, if the threshold value is set as an upper limit value of the slope at the time of the filter 3 being normal, when the slope is larger than the threshold value, a determination can be made that the filter 3 is in a failure. In addition, the extent of the failure of the filter 3 can also be calculated according to the above-mentioned slope.

Here, note that in this embodiment, the above-mentioned slope is calculated based on the amount of PM when the flow speed of the exhaust gas is equal to or larger than the predetermined value A and is equal to or less than the predetermined value F, but the above-mentioned slope may be calculated including the amount of PM at the time of the flow speed of the exhaust gas being less than the predetermined value A.

Figure 11:
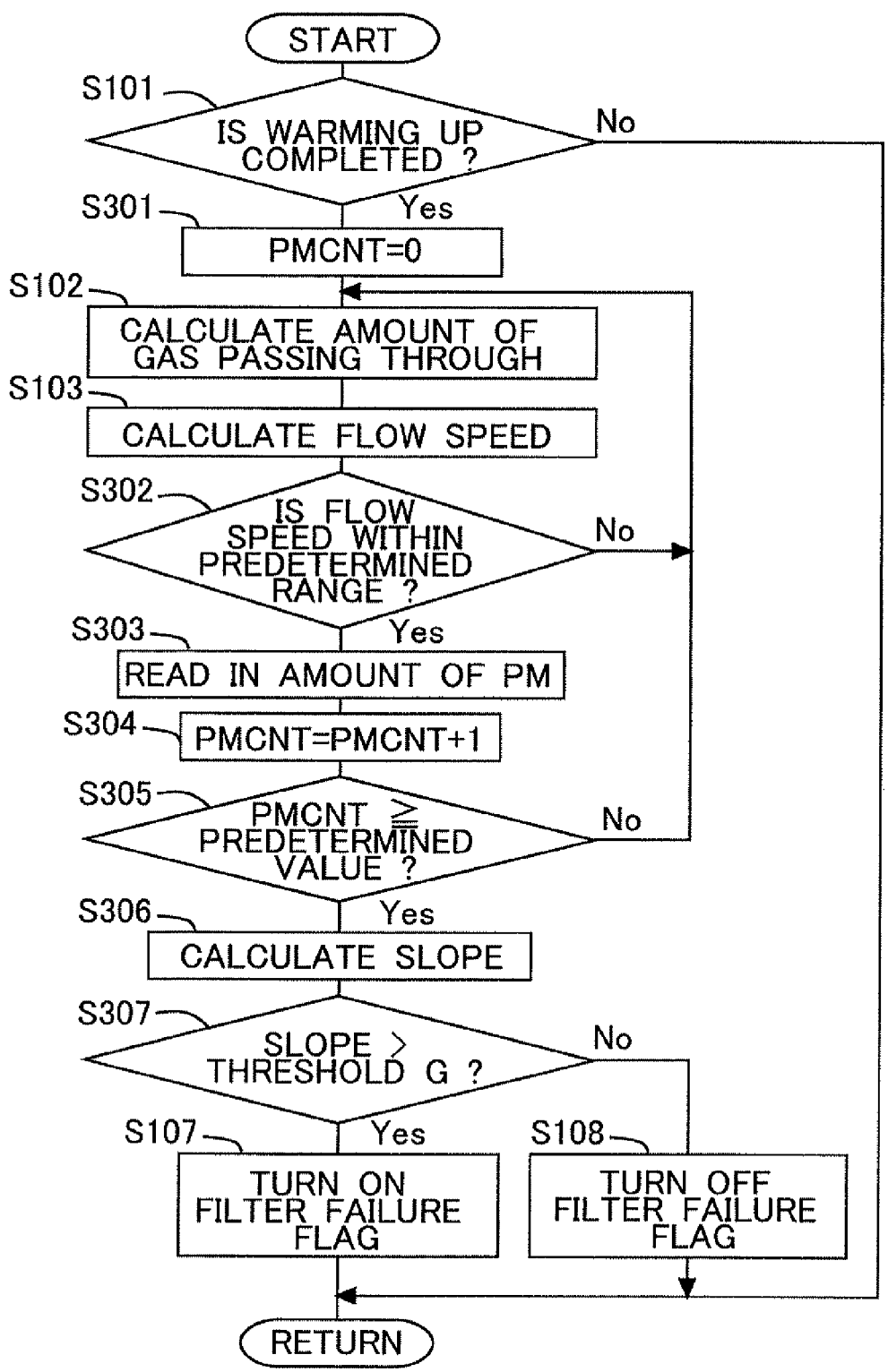
FIG. 11 is a flow chart showing a flow for detecting a failure of a filter according to a fourth embodiment.

Next, FIG. 11 is a flow chart showing a flow for detecting the failure of the filter 3 according to this fourth embodiment. This routine is carried out by means of the ECU 10 at each predetermined time interval. Here, note that for those steps in which the same processing as in the aforementioned flow chart is carried out, the same symbols are attached and an explanation thereof is omitted.

In step S301, the value of a counter PMCNT is set to 0. The number of times or frequency at which the amount of PM has been acquired is stored by means of this counter PMCNT.

In step S302, it is determined whether the flow speed of the exhaust gas is within a predetermined range. The predetermined range referred to herein is a range which is equal to or larger than the predetermined value A and which is equal to or less than the predetermined value F. That is, in this step, it is determined whether the flow speed of the exhaust gas is suitable for acquiring the amount of PM. In cases where an affirmative determination is made in step S302, the routine advances to step S303, whereas in cases where a negative determination is made, the routine returns to step S102.

In step S303, the amount of PM at the downstream side of the filter 3 is read in. In addition, the flow speed of the exhaust gas at the time when the amount of PM was detected is also read in simultaneously.

In step S304, 1 is added to the counter PMCNT. That is, because the amount of PM was acquired in step S303, the counter PMCNT is caused to increment.

In step S305, it is determined whether the value of the counter PMCNT is equal to or larger than a predetermined value. The predetermined value referred to herein is a number of times of acquisition of the amount of PM with which the above-mentioned slope can be calculated. That is, in this step, it is determined whether the slope can be calculated. In cases where an affirmative determination is made in step S305, the routine advances to step S306, whereas in cases where a negative determination is made, the routine returns to step S102.

In step S306, the slope is calculated by the use of the method of least squares, for example, while assuming that the flow speed of the exhaust gas and the amount of PM are in a linear relation.

In step S307, it is determined whether the slope is larger than a threshold value G. The threshold value G is an upper limit value of the slope at the time of the filter 3 being normal, and has been beforehand obtained through experiments, etc. In this step, it is determined whether the filter 3 is in a failure. In cases where an affirmative determination is made in step S307, the routine advances to step S107, whereas in cases where a negative determination is made, the routine advances to step S108. Here, note that in this embodiment, the ECU 10, which carries out the processing of step S307, corresponds to a determination part in the present invention.

In this manner, the slope in a predetermined range including the predetermined value A in which the flow speed of the exhaust gas lies, or in a predetermined range equal to or higher than the predetermined value A in which the flow speed of the exhaust gas lies, is calculated, and in cases where this slope is equal to or larger than a threshold value, a determination can be made that the filter 3 is in a failure. In addition, in this embodiment, due to the fact that the above-mentioned ratio is calculated by obtaining the relation between the flow speed of the exhaust gas passing through the filter 3 and the amount of PM at the downstream side of the filter 3 at the plurality of times, the accuracy thereof is high.

Fifth Embodiment

In this embodiment, assuming that the flow speed of the exhaust gas and the amount of PM are in a linear relation when the flow speed of the exhaust gas is in a range from a predetermined value C to a predetermined value A, a relational expression of the flow speed of the exhaust gas and the amount of PM is obtained. Then, based on how much the actual amount of PM varies, it is determined from this relational expression whether the filter 3 is in a failure. Here, note that the predetermined value A is the same as that in the second embodiment. Also, the predetermined value C is the same as that in the third embodiment. The other devices, parts and so on are the same as those in the first embodiment, so the explanation thereof is omitted.

As explained in the second embodiment, in cases where the filter 3 is in a failure, when the flow speed of the exhaust gas exceeds a sudden change point, the amount of PM at the downstream side of the filter 3 becomes larger in an abrupt manner. Accordingly, when the filter 3 is in a failure, the difference between the amount of PM at the downstream side of the filter 3 at the time when the flow speed of the exhaust gas is the predetermined value A, and the amount of PM at the downstream side of the filter 3 at the time when the flow speed of the exhaust gas is the predetermined value C becomes large. In addition, in cases where the filter 3 is normal, the flow speed of the exhaust gas and the amount of PM become a linear relation, but in cases where the filter 3 is in a failure, the flow speed of the exhaust gas and the amount of PM actually become a nonlinear relation. Accordingly, in cases where the relational expression of the flow speed of the exhaust gas and the amount of PM is calculated on the assumption that the flow speed of the exhaust gas and the amount of PM are in a linear relation, when the filter 3 is in a failure, the difference between the amount of PM actually detected and the relational expression thus calculated becomes large. Then, the higher the extent of the failure of the filter 3, the larger the difference between the actually detected amount of PM and the calculated relational expression becomes.

Figure 12:
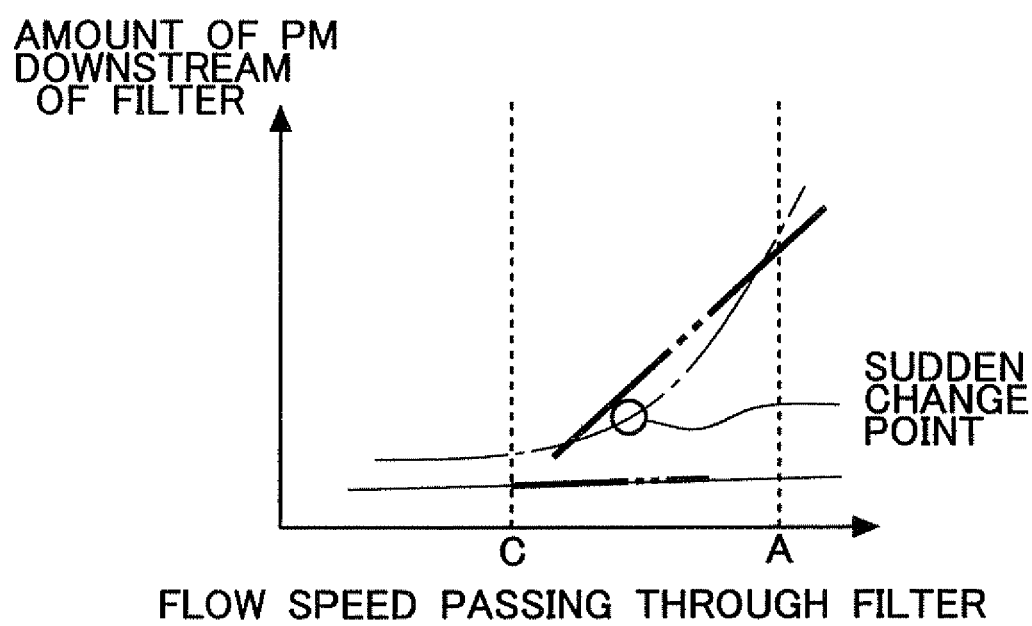
FIG. 12 is a view showing the relation among the flow speed of the exhaust gas passing through the filter, the amount of PM at the downstream side of the filter, the predetermined value A, and the predetermined value C.

Here, FIG. 12 is a view showing the relation among the flow speed of the exhaust gas passing through the filter 3, the amount of PM at the downstream side of the filter 3, a predetermined value A, and a predetermined value C. A solid line represents a case in which the filter 3 is normal, and an alternate long and short dash line represents a case in which the filter 3 is in a failure. Also, an alternate long and two short dashes line represents a case in which it is assumed that the flow speed of the exhaust gas and the amount of PM are in a linear relation. The predetermined value A is the same as that in the second embodiment. The predetermined value C is the same as that in the third embodiment. Here, note that in this embodiment, a range from the predetermined value C to the predetermined value A corresponds to a predetermined range in the present invention. In addition, the predetermined range should just include the predetermined value A, and may include a range in which the flow speed of the exhaust gas is higher than the predetermined value A.

In cases where the filter 3 is in a failure, the relation between the flow speed of the exhaust gas and the actual amount of PM becomes nonlinear, as shown by the alternate long and short dash line. For this reason, depending on the flow speed of the exhaust gas, there arises a deviation or shift between the alternate long and two short dashes line obtained on the assumption that the relation between the flow speed of the exhaust gas and the actual amount of PM is linear, and the alternate long and short dash line which represents the actual relation. The degree of this deviation or shift becomes larger in accordance with the extent of the failure of the filter 3. For example, an accumulated or integrated value of the difference between the amount of PM obtained from the relation shown by the alternate long and two short dashes line and the actual amount of PM becomes larger in accordance with the extent of the failure of the filter 3, so a determination as to whether the filter 3 is in a failure can be made based on the integrated value. In addition, for example, if a threshold value is set as an upper limit value of the integrated value at the time of the filter 3 being normal, when the integrated value is larger than the threshold value, a determination can be made that the filter 3 is in a failure. Moreover, the extent of the failure of the filter 3 can also be calculated according to the integrated value. This integrated value may also be an area of a part which is surrounded by the alternate long and short dash line and the alternate long and two short dashes line in FIG. 12.

Figure 13:
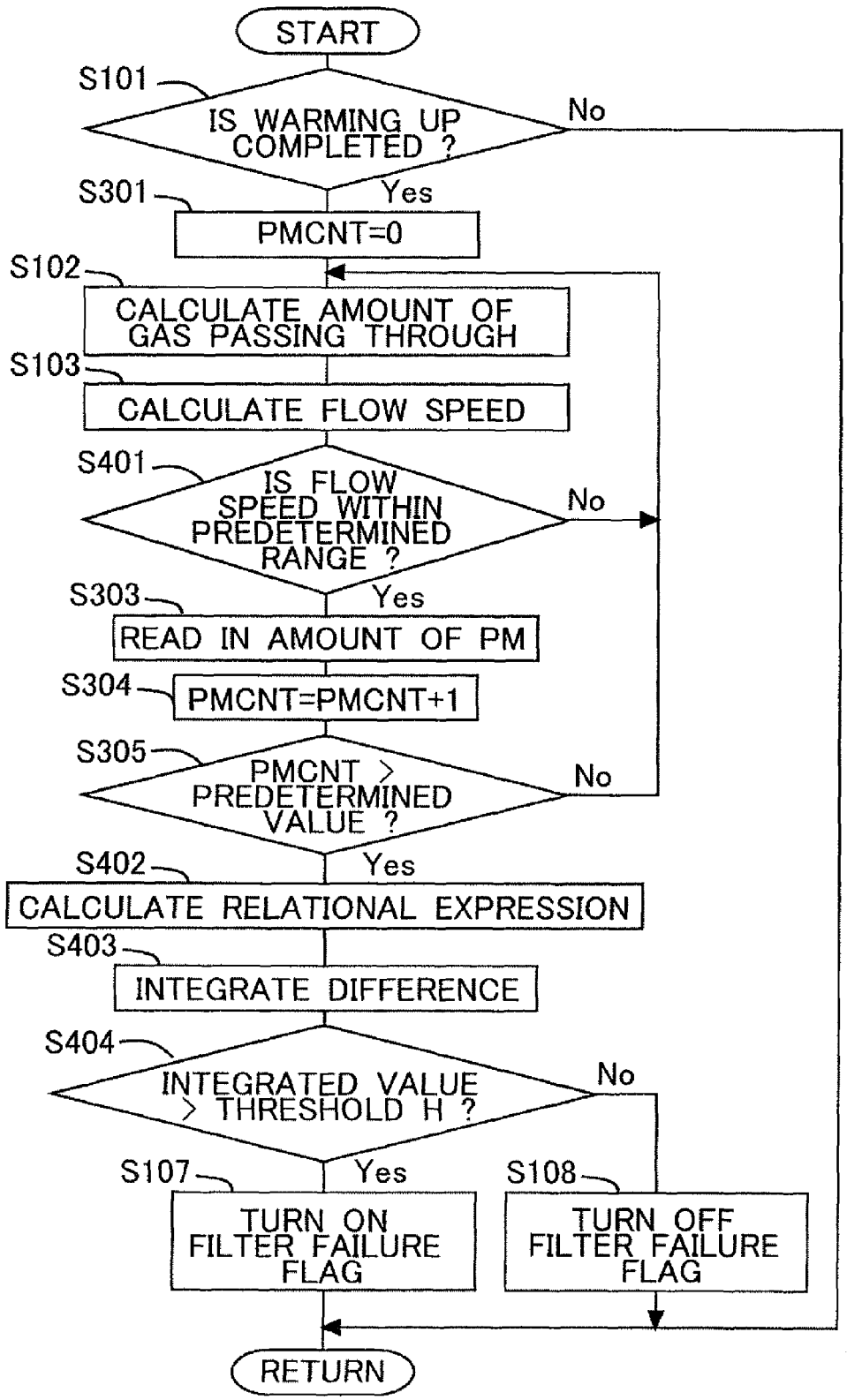
FIG. 13 is a flow chart showing a flow for detecting a failure of a filter according to a fifth embodiment.

Next, FIG. 13 is a flow chart showing a flow for detecting the failure of the filter 3 according to this fifth embodiment. This routine is carried out by means of the ECU 10 at each predetermined time interval. Here, note that for those steps in which the same processing as in the aforementioned flow chart is carried out, the same symbols are attached and an explanation thereof is omitted.

In step S401, it is determined whether the flow speed of the exhaust gas is within a predetermined range. The predetermined range referred to herein is a range which is equal to or larger than the predetermined value C and which is equal to or less than the predetermined value A. That is, in this step, it is determined whether the flow speed of the exhaust gas is suitable for acquiring the amount of PM. In cases where an affirmative determination is made in step S401, the routine advances to step S303, whereas in cases where a negative determination is made, the routine returns to step S102.

In step S402, the relational expression is calculated by the use of the method of least squares, for example, while assuming that the flow speed of the exhaust gas and the amount of PM are in a linear relation.

In step S403, an integrated value of the difference between the relational expression obtained in step S402 and the amount of PM read in step S303 is calculated. That is, with respect to each of the amounts of PM read in a plurality of times, the difference is calculated for each of the flow speeds of the exhaust gas, and a sum of the differences is calculated.

In step S404, it is determined whether the integrated value calculated in step S403 is larger than a threshold value H. The threshold value H is an upper limit value of the integrated value at the time of the filter 3 being normal, and has been beforehand obtained through experiments, etc. In this step, it is determined whether the filter 3 is in a failure. In cases where an affirmative determination is made in step S404, the routine advances to step S107, whereas in cases where a negative determination is made, the routine advances to step S108. Here, note that in this embodiment, the ECU 10, which carries out the processing of step S404, corresponds to a determination part in the present invention.

In this manner, it is possible to determine, with a high degree of accuracy, whether the filter 3 is in a failure, based on the degree of variation between the relational expression, which is obtained on the assumption that the flow speed of the exhaust gas and the amount of PM are in the linear relation at the time when the flow speed of the exhaust gas is equal to or larger than the predetermined value C and is equal to or less than the predetermined value A, and the detected amount of PM.

Sixth Embodiment

Here, in this embodiment, the ratios of the amounts of change in the amount of PM to the amounts of change in the flow speed of the exhaust gas are calculated when the flow speed of the exhaust gas is equal to or larger than a predetermined value A, and when the flow speed of the exhaust gas is less than the predetermined value A, respectively. At this time, it is assumed that the relation between the flow speed of the exhaust gas and the amount of PM is linear, at the time of the flow speed of the exhaust gas being equal to or larger than the predetermined value A, and at the time of the flow speed of the exhaust gas being less than the predetermined value A, respectively. These ratios can be calculated as "slopes", similarly as in the fourth embodiment. That is, similar to the fourth embodiment, the respective slopes are calculated by assuming that the relation between the flow speed of the exhaust gas and the amount of PM is linear, at the time of the flow speed of the exhaust gas being equal to or larger than the predetermined value A, and at the time of the flow speed of the exhaust gas being less than the predetermined value A, respectively. Then, the slope at the time of the flow speed of the exhaust gas being equal to or larger than the predetermined value A and the slope at the time of the flow speed of the exhaust gas being less than the predetermined value A are compared with, each other, and when the difference or ratio between them is large, a determination is made that the filter 3 is in a failure. Here, note that the predetermined value A is the same as that in the second embodiment. The other devices, parts and so on are the same as those in the first embodiment, so the explanation thereof is omitted.

That is, in cases where the filter 3 is in a failure, when the flow speed of the exhaust gas becomes equal to or higher than the predetermined value A, the ratio of the amount of change in the amount of PM with respect to the amount of change in the flow speed of the exhaust gas becomes relatively large. On the other hand, in cases where the flow speed of the exhaust gas is less than the predetermined value A, even if the filter 3 is in a failure, the ratio of the amount of change in the amount of PM to the amount of change in the flow speed of the exhaust gas is lower than that in cases where the flow speed of the exhaust gas is equal to or larger than the predetermined value A. In addition, in cases where the filter 3 is normal, the ratio of the amount of change in the amount of PM to the amount of change in the flow speed of the exhaust gas becomes substantially constant without regard to the flow speed of the exhaust gas. Accordingly, it is possible to detect the failure of the filter 3 by making a comparison between the ratio of the amount of change in the amount of PM to the amount of change in the flow speed of the exhaust gas at the time of the flow speed of the exhaust gas being equal to or larger than the predetermined value A, and that at the time of the flow speed of the exhaust gas being less than the predetermined value A.

Figure 14:
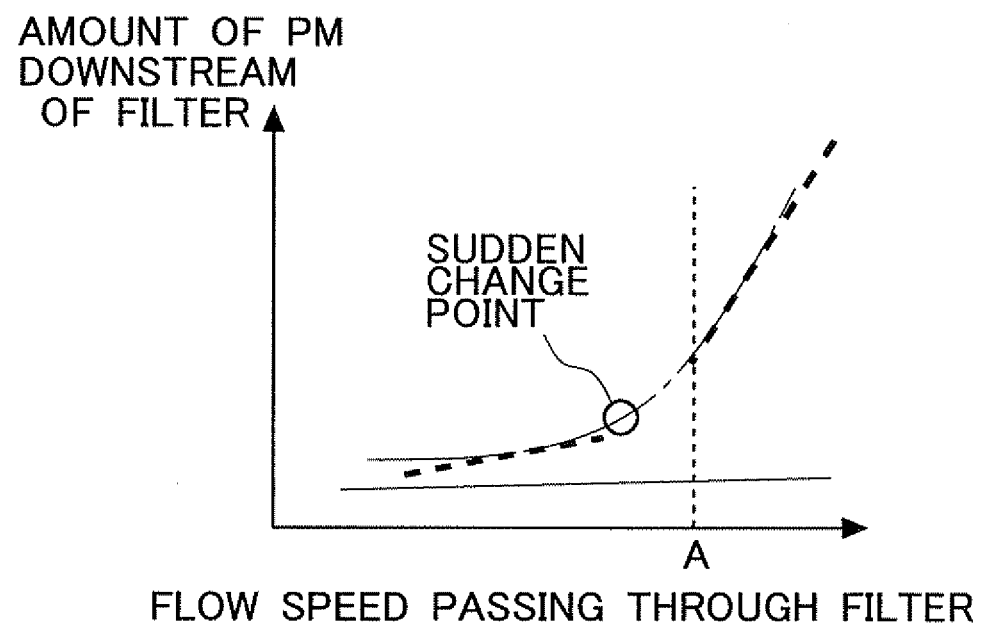
FIG. 14 is a view showing the relation among the flow speed of the exhaust gas passing through the filter, the amount of PM at the downstream side of the filter, and the predetermined value A.

Here, FIG. 14 is a view showing the relation among the flow speed of the exhaust gas passing through the filter 3, the amount of PM at the downstream side of the filter 3, and a predetermined value A. A solid line represents a case in which the filter 3 is normal, and an alternate long and short dash line represents a case in which the filter 3 is in a failure. Also, a broken line represents a case in which it is assumed that the flow speed of the exhaust gas and the amount of PM are in a linear relation. The predetermined value A is the same as that in the second embodiment.

In this manner, the slope of the broken line differs between the case in which the flow speed of the exhaust gas is equal to or larger than the predetermined value A, and the case in which the flow speed of the exhaust gas is less than the predetermined value. The difference of the slopes becomes larger in accordance with the extent of the failure of the filter 3. Accordingly, if a threshold value is set as an upper limit value of the difference of the slopes at the time of the filter 3 being normal, when the difference of the slopes actually obtained is larger than the threshold value, a determination can be made that the filter 3 is in a failure. In addition, the extent of the failure of the filter 3 can also be calculated according to the difference of the slopes. Here, note that the failure detection can also be carried out by the use of the ratio of the slopes, in place of the difference of the slopes.

Figure 15:
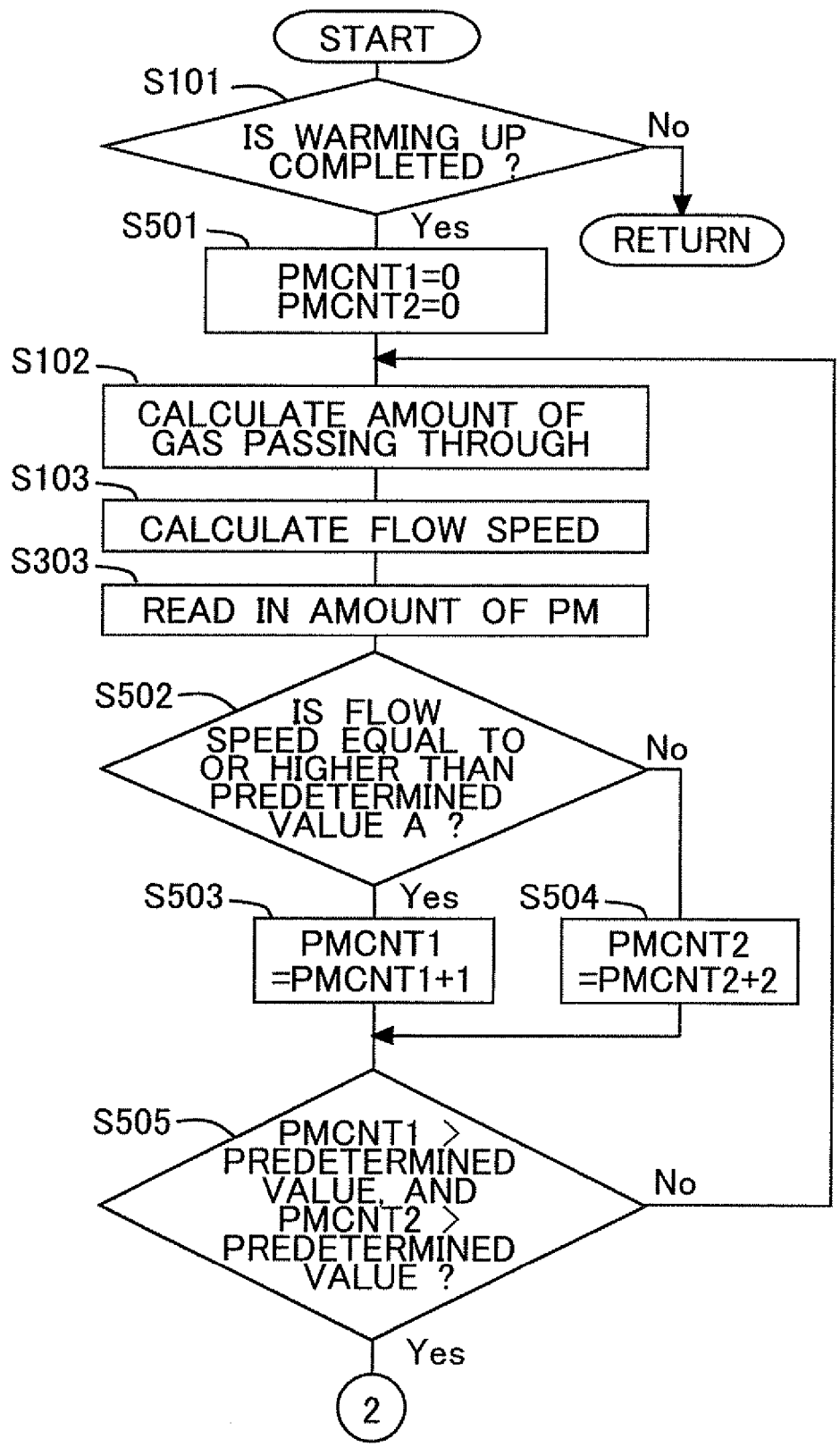
FIG. 15 is a flow chart showing a flow (a first part) for detecting a failure of a filter according to a sixth embodiment.
Figure 16:
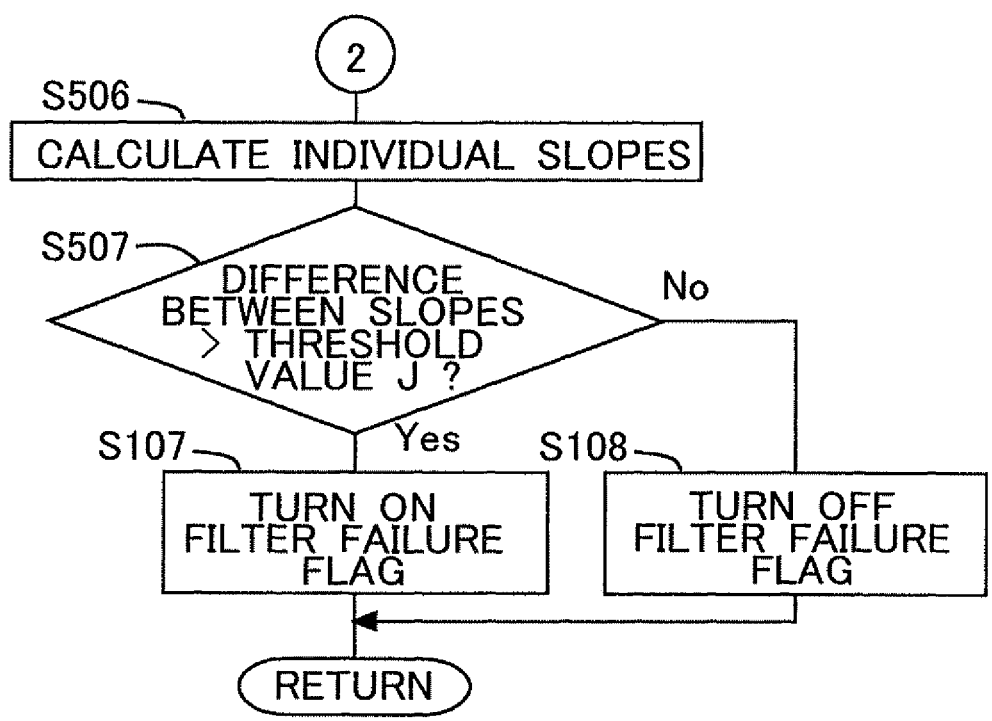
FIG. 16 is a flow chart showing a flow (a second continued part) for detecting a failure of a filter according to the sixth embodiment.

Next, FIG. 15 and FIG. 16 are flow charts showing a flow for detecting the failure of the filter 3 according to this embodiment. This routine is carried out by means of the ECU 10 at each predetermined time interval. Here, note that for those steps in which the same processing as in the aforementioned flow chart is carried out, the same symbols are attached and an explanation thereof is omitted.

In step S501, the value of a counter PMCNT1 and the value of a counter PMCNT2 are set to 0. The number of times or frequency at which the amount of PM has been acquired at the time when the flow rate of the exhaust gas is equal to or larger than the predetermined value A is stored by means of the counter PMCNT1, and the number of times or frequency at which the amount of PM has been acquired at the time when the flow rate of the exhaust gas is less than the predetermined value A is stored by means of the counter PMCNT2.

In step S502, it is determined whether the flow speed of the exhaust gas is equal to or larger than the predetermined value A. In cases where an affirmative determination is made in step S502, the routine advances to step S503, whereas in cases where a negative determination is made, the routine advances to step S504.

In step S503, 1 is added to the counter PMCNT1 Also, in step S504, 1 is added to the counter PMCNT2.

In step S505, it is determined whether the value of the counter PMCNT1 and the value of the counter PMCNT2 are both equal to or larger than a predetermined value. The predetermined value referred to herein is a number of times of acquisition of the amount of PM with which the above-mentioned slopes can be calculated. That is, in this step, both at the time of the flow rate of the exhaust gas being equal to or larger than the predetermined value A and at the time of the flow rate of the exhaust gas being less than the predetermined value A, it is determined whether the slopes can be calculated. In cases where an affirmative determination is made in step S505, the routine advances to step S506, whereas in cases where a negative determination is made, the routine returns to step S102.

In step S506, the slopes at the time of the flow rate of the exhaust gas being equal to or larger than the predetermined value A and at the time of the flow rate of the exhaust gas being less than the predetermined value A are calculated by the use of the method of least squares, for example, while assuming that the flow speed of the exhaust gas and the amount of PM are in a linear relation.

In step S507, it is determined whether the difference between the slope at the time of the flow rate of the exhaust gas being equal to or larger than the predetermined value A, and the slope at the time of the flow rate of the exhaust gas being less than the predetermined value is larger than a threshold value J. The threshold value J is an upper limit value of the difference between the slopes at the time of the filter 3 being normal, and has been beforehand obtained through experiments, etc. In this step, it is determined whether the filter 3 is in a failure. In cases where an affirmative determination is made in step S507, the routine advances to step S107, whereas in cases where a negative determination is made, the routine advances to step S108. Here, note that in this embodiment, the ECU 10, which carries out the processing of step S507, corresponds to a determination part in the present invention.

Also, by doing so as described above, a failure determination of the filter 3 can be carried out with a high degree of accuracy.

EXPLANATION OF REFERENCE NUMERALS AND CHARACTERS 1 internal combustion engine
2 exhaust passage
3 filter
4 PM sensor
5 temperature sensor
6 pressure sensor
7 intake passage
8 air flow meter
9 fuel injection valve
10 ECU
11 accelerator pedal
12 accelerator opening sensor
13 crank position sensor

The invention claimed is:

1. A filter failure detection apparatus of an internal combustion engine comprising:
   a filter that is arranged on an exhaust passage of the internal combustion engine for collecting a substance contained in an exhaust gas;
   a substance amount detection part that is arranged on the exhaust passage at a downstream side of said filter for detecting an amount of said substance which passes through said filter;
   a flow speed detection part that detects or estimates a flow speed of the exhaust gas which passes through said filter; and
   a determination part that makes a determination that said filter is in a failure if the determination part determines that a ratio of an amount of change in the amount of the substance detected by the substance amount detection part to an amount of change in the flow speed of the exhaust gas detected or estimated by the flow speed detection part is becoming larger as the flow speed of the exhaust gas passing through the filter becomes higher.

2. The filter failure detection apparatus of an internal combustion engine as set forth in claim 1, wherein
   said determination part makes the determination that said filter is in the failure, if the flow speed of the exhaust gas detected or estimated by said flow speed detection part is equal to or less than a threshold value in cases where the ratio of the amount of change in said amount of the substance to the amount of change in said flow speed of the exhaust gas is equal to or larger than a specified value.

3. The filter failure detection apparatus of an internal combustion engine as set forth in claim 1, wherein
said determination part makes the determination that said filter is in the failure, if the amount of the substance detected by said substance amount detection part is equal to or larger than a threshold value in cases where the ratio of the amount of change in said amount of the substance to the amount of change in said flow speed of the exhaust gas is equal to or larger than a specified value.

4. The filter failure detection apparatus of an internal combustion engine as set forth in claim 1, wherein
said filter is arranged on an exhaust passage of a diesel engine, and collects particulate matter in an exhaust gas thereof.

5. The filter failure detection apparatus of an internal combustion engine as set forth in claim 1, wherein
said substance amount detection part is a sensor that measures an amount of particulate matter in the exhaust gas.

6. The filter failure detection apparatus of an internal combustion engine as set forth in claim 1, wherein
said determination part calculates the ratio of the amount of change in the amount of the substance to the amount of change in the flow speed of the exhaust gas on the assumption that the flow speed of the exhaust gas and the amount of the substance are in a linear relation, if said flow speed of the exhaust gas is within a predetermined range which includes a predetermined value, or within a predetermined range which is equal to or larger than the predetermined value, and makes a determination that said filter is in the failure, in cases where this ratio is equal to or larger than the threshold value.

7. The filter failure detection apparatus of an internal combustion engine as set forth in claim 6, wherein
said predetermined value is a flow speed of the exhaust gas at the time if the ratio of the amount of change in the amount of the substance detected by said substance amount detection part to the amount of change in the flow speed of the exhaust gas detected or estimated by said flow speed detection part at the time of the extent of the failure of the filter being on the border of an allowable range becomes a specified value.

8. The filter failure detection apparatus of an internal combustion engine as set forth in claim 1, wherein
said determination part calculates the ratio of the amount of change in the amount of the substance to the amount of change in the flow speed of the exhaust gas on the assumption that the flow speed of the exhaust gas and the amount of the substance are in a linear relation, if said flow speed of the exhaust gas is within a predetermined range which includes a predetermined value, and makes a determination that said filter is in the failure, in cases where a sum of a difference between the amount of the substance obtained based on said ratio and the amount of the substance detected by said substance amount detection part is equal to or larger than a threshold value.

9. The filter failure detection apparatus of an internal combustion engine as set forth in claim 8, wherein
said predetermined value is a flow speed of the exhaust gas at the time if the ratio of the amount of change in the amount of the substance detected by said substance amount detection part to the amount of change in the flow speed of the exhaust gas detected or estimated by said flow speed detection part at the time of the extent of the failure of the filter being on the border of an allowable range becomes a specified value.

10. The filter failure detection apparatus of an internal combustion engine as set forth in claim 1, wherein
said determination part calculates the ratios of the amounts of change in the amount of the substance to the amounts of change in the flow speed of the exhaust gas on the assumption that said flow speed of the exhaust gas and said amount of the substance are in a linear relation, if said flow speed of the exhaust gas is equal to or larger than a predetermined value, and if said flow speed of the exhaust gas is less than the predetermined value, respectively, and makes a determination that said filter is in the failure, if a difference between these ratios or each of the ratios is equal to or larger than a threshold value.

11. The filter failure detection apparatus of an internal combustion engine as set forth in claim 10, wherein
said predetermined value is a flow speed of the exhaust gas at the time if the ratio of the amount of change in the amount of the substance detected by said substance amount detection part to the amount of change in the flow speed of the exhaust gas detected or estimated by said flow speed detection part at the time of the extent of the failure of the filter being on the border of an allowable range becomes a specified value.

12. The filter failure detection apparatus of an internal combustion engine as set forth in claim 1, wherein
said determination part makes the determination that said filter is in the failure, if said amount of the substance detected by said substance amount detection part is equal to or larger than a threshold value in cases where said flow speed of the exhaust gas is equal to or larger than a predetermined value.

13. The filter failure detection apparatus of an internal combustion engine as set forth in claim 12, wherein
said determination part changes said threshold value in accordance with said flow speed of the exhaust gas.

14. The filter failure detection apparatus of an internal combustion engine as set forth in claim 12, wherein
said predetermined value is a flow speed of the exhaust gas at the time if the ratio of the amount of change in the amount of the substance detected by said substance amount detection part to the amount of change in the flow speed of the exhaust gas detected or estimated by said flow speed detection part at the time of the extent of the failure of the filter being on the border of an allowable range becomes a specified value.

15. The filter failure detection apparatus of an internal combustion engine as set forth in claim 1, wherein
said determination part determines whether said filter is in the failure, by making a comparison between said amount of the substance detected by said substance amount detection part at the time of said flow speed of the exhaust gas being equal to or larger than a predetermined value, and said amount of the substance detected by said substance amount detection part at the time of said flow speed of the exhaust gas being less than the predetermined value.

16. The filter failure detection apparatus of an internal combustion engine as set forth in claim 15, wherein
said determination part makes the determination that said filter is in the failure, in cases where a difference or ratio between said amount of the substance detected by said substance amount detection part at the time of said flow speed of the exhaust gas being equal to or larger than the predetermined value and said amount of the substance detected by said substance amount detection part at the time of said flow speed of the exhaust gas being less than the predetermined value is equal to or larger than a threshold value.

17. The filter failure detection apparatus of an internal combustion engine as set forth in claim 15, wherein
said predetermined value is a flow speed of the exhaust gas at the time if the ratio of the amount of change in the amount of the substance detected by said substance amount detection part to the amount of change in the flow speed of the exhaust gas detected or estimated by said flow speed detection part at the time of the extent of the failure of the filter being on the border of an allowable range becomes a specified value.

* * * * *